US009004206B2

(12) United States Patent
Kawaguchi et al.

(10) Patent No.: US 9,004,206 B2
(45) Date of Patent: Apr. 14, 2015

(54) ENGINE CONTROL DEVICE OF WORK MACHINE AND ENGINE CONTROL METHOD THEREFOR

(75) Inventors: Tadashi Kawaguchi, Hiratsuka (JP); Takao Suehiro, Hiratsuka (JP); Kentaro Murakami, Chigasaki (JP); Jun Morinaga, Yokohama (JP)

(73) Assignee: Komatsu Ltd., Tokyo (JP)

( * ) Notice: Subject to any disclaimer, the term of this patent is extended or adjusted under 35 U.S.C. 154(b) by 0 days.

(21) Appl. No.: 13/817,999

(22) PCT Filed: Apr. 17, 2012

(86) PCT No.: PCT/JP2012/060382
§ 371 (c)(1),
(2), (4) Date: Feb. 20, 2013

(87) PCT Pub. No.: WO2012/157388
PCT Pub. Date: Nov. 22, 2012

(65) Prior Publication Data
US 2014/0054902 A1 Feb. 27, 2014

(30) Foreign Application Priority Data

May 18, 2011 (JP) ................................. 2011-111388

(51) Int. Cl.
*B60W 10/08* (2006.01)
*H02P 9/04* (2006.01)
*F02D 41/02* (2006.01)
(Continued)

(52) U.S. Cl.
CPC ................ *H02P 9/04* (2013.01); *F02D 41/021* (2013.01); *F02D 29/04* (2013.01); *F02D 29/06* (2013.01); *F02D 31/007* (2013.01)

(58) Field of Classification Search
USPC .............................. 180/65.28, 65.285, 65.265
See application file for complete search history.

(56) References Cited

U.S. PATENT DOCUMENTS 6,441,506 B2 * 8/2002 Nakashima ................. 290/40 C
7,290,525 B1 * 11/2007 Kapsokavathis et al. ..... 123/329
(Continued)

FOREIGN PATENT DOCUMENTS

CN 101861455 A 10/2010
CN 101900043 A 12/2010
(Continued)

OTHER PUBLICATIONS

International Search Report dated Aug. 7, 2012, issued for PCT/JP2012/060382.

*Primary Examiner* — Jeffrey J Restifo
(74) *Attorney, Agent, or Firm* — Locke Lord LLP

(57) ABSTRACT

An engine control device is provided including: detection units for detecting a driving state of a work machine using a generator, target engine speed setting units for causing, on the basis of the driving state, a target engine speed set for a case where electric power generation by the generator is OFF to be the same as a target engine speed set for a case where the electric power generation by the generator is ON, and engine target output calculation units for calculating an engine target output during electric power generation OFF that can be output at most when the electric power generation by the generator is OFF, and calculates an engine target output obtained by adding an output corresponding to an electric power generation amount by the generator to the engine target output when the electric power generation by the generator is ON.

8 Claims, 18 Drawing Sheets

(51) Int. Cl.
*F02D 29/04* (2006.01)
*F02D 29/06* (2006.01)
*F02D 31/00* (2006.01)

(56) References Cited

U.S. PATENT DOCUMENTS

| | | | |
|---|---|---|---|
| 7,350,611 B2* | 4/2008 | Betz et al. | 180/69.3 |
| 7,398,147 B2* | 7/2008 | Kozarekar et al. | 701/101 |
| 8,348,806 B2* | 1/2013 | Baino et al. | 477/15 |
| 8,424,302 B2 | 4/2013 | Morinaga et al. | |
| 8,610,382 B2* | 12/2013 | Goldammer et al. | 318/139 |
| 8,695,566 B2 | 4/2014 | Kawaguchi et al. | |
| 8,798,876 B2 | 8/2014 | Yanagisawa | |
| 2007/0080236 A1* | 4/2007 | Betz et al. | 237/12.1 |
| 2009/0120700 A1* | 5/2009 | Fukumura | 180/65.265 |
| 2009/0320461 A1* | 12/2009 | Morinaga et al. | 60/431 |
| 2011/0295453 A1* | 12/2011 | Betz et al. | 701/22 |
| 2011/0320095 A1* | 12/2011 | Anderson et al. | 701/54 |
| 2012/0161679 A1* | 6/2012 | Goldammer et al. | 318/400.3 |
| 2012/0161723 A1* | 6/2012 | Wai et al. | 322/22 |
| 2013/0304292 A1* | 11/2013 | Moriki et al. | 701/22 |
| 2014/0054902 A1* | 2/2014 | Kawaguchi et al. | 290/40 B |

FOREIGN PATENT DOCUMENTS

| | | |
|---|---|---|
| JP | 2003-102106 A | 4/2003 |
| JP | 2005-304206 A | 10/2005 |
| JP | 2006-341708 A | 12/2006 |
| JP | 2007-120426 A | 5/2007 |
| JP | 2009-113711 A | 5/2009 |
| JP | 2010-173599 A | 8/2010 |
| WO | WO-2010/150382 A1 | 12/2010 |

* cited by examiner np1: TARGET MATCHING ENGINE SPEED    nm1: NO-LOAD MINIMUM ENGINE SPEED
np1a: NO-LOAD ENGINE SPEED
np2: NO-LOAD MAXIMUM ENGINE SPEED

ENGINE CONTROL DEVICE OF WORK MACHINE AND ENGINE CONTROL METHOD THEREFOR

CROSS REFERENCE TO RELATED APPLICATIONS

This application is related to co-pending application, entitled, "ENGINE CONTROL DEVICE OF WORK MACHINE AND ENGINE CONTROL METHOD THEREFOR" filed concurrently herewith in the names of Tadashi Kawaguchi, Kentaro Murakami and Jun Morinaga as a national stage application of International Application No. PCT/JP2012/060259, filed Apr. 16, 2012, which application is assigned to the assignee of the instant application and which co-pending application is also incorporated by reference herein.

FIELD

The present invention relates to an engine control device of work machine including construction machines such as excavators, bulldozers, dump trucks, wheel loaders, and an engine control method therefor.

BACKGROUND

In an engine control such as a diesel engine (hereinafter, engine) used for a work machine, when an operator of the work machine sets a fuel adjustment dial (throttle dial) provided in a cab to any position, the engine controller outputs, to a fuel injection system, a control signal for injecting the amount of fuel injection in accordance with setting to the engine. The engine controller outputs a control signal in accordance with change of the load of the working machine attached to the work machine and adjusts the engine speed, so as to maintain the target engine speed set by the fuel adjustment dial (throttle dial). The engine controller or a pump controller calculates a target absorption torque of the hydraulic pump in accordance with the target engine speed. This target absorption torque is set such that the output horsepower of the engine matches the absorption horsepower of the hydraulic pump.

An ordinary engine control will be explained with reference to FIG. 20. As illustrated in FIG. 20, the engine is controlled so as not to exceed an engine output torque line TL constituted by a maximum output torque line P1 of the engine and an engine droop line Fe at which the engine speed is the maximum. For example, when the work machine is an excavator, the engine controller generates a control signal for changing the engine speed in accordance with rotation operation of the upper swing body, the amount of manipulation of a manipulation lever manipulated for working machine operation, the load of the working machine, and the like. For example, when excavation operation of soil and the like is performed while the target engine speed is as N2, an engine speed (Idling engine speed N1) while the engine is in idling operation is changed to a target engine speed N2. At this occasion, in response to the control signal from the engine controller, the fuel injection system injects fuel to the engine in accordance with this change, and when working machine operation and the like is performed to increase the load, the engine speed is changed so that the engine speed and the engine output torque reaches a matching point M1 corresponding to a crossing point of an engine output torque line TL and a pump absorption torque line PL of a variable displacement hydraulic pump (typically, swash plate hydraulic pump). At a rated point P, the engine output is the maximum.

In this case, in order to improve fuel-efficiency of the engine and the pump efficiency of the hydraulic pump, there is an engine control device as illustrated in FIG. 21, in which a target engine driving line (target matching route) ML passing a region where a fuel consumption rate is high is made, and a matching point of the engine output and the pump absorption torque is taken on this target matching route ML. In FIG. 21, a curved line M denotes an equal fuel-efficiency curved line of an engine and the like, and a point closer to the center of the curved line M (eye (M1)) is more advantageous in the fuel consumption rate. The curved line J denotes an equal horsepower curved line at which the horse power absorbed by the hydraulic pump is the equal horsepower. Therefore, in order to obtain a same horsepower, the fuel consumption rate is better if matching is obtained at the matching point pt2 on the target matching route ML as compared with the matching point pt1 on the engine droop line Fe. A flow rate Q of the hydraulic pump is a product of the engine speed n and a pump capacity q ($Q = n \cdot q$), and in order to obtain a same operating oil flow rate, the pump efficiency is better when the engine speed is reduced and the pump capacity is increased.

CITATION LIST

Patent Literature

Patent Literature 1: Japanese Patent Application Laid-open No. 2007-120426
Patent Literature 2: Japanese Patent Application Laid-open No. 2005-304206

SUMMARY

Technical Problem

By the way, there is a construction machine such as a hybrid excavator which drives the upper swing body with the electric swing motor. In the hybrid excavator, electric power is provided (discharged) from an electric storage device such as a capacitor to this electric swing motor, so that the swing of the upper swing body is accelerated, and when the swing of the upper swing body is decelerated, electric power is provided (charged) to the capacitor using regeneration of the electric swing motor, thus achieving a lower fuel consumption rate than conventional excavators. Further, in response to the load of the working machine, the hybrid excavator activates electric power generation by a generator driven by the engine (turns on electric power generation), so that the electric power generated by the generator is provided (charged) to the capacitor, or the electric power generated by the generator is provided to accelerate the swing of the electric swing motor. The generator performs assist action to compensate the output of the engine in accordance with the load of the hybrid excavator, thus achieving a low fuel consumption rate. This generator is not efficient when generating electric power with a small torque, like an ordinary electric motor. For this reason, when the generator generates electric power, the generator generates electric power with a torque equal to or more than a minimum electric power generation torque that is set in advance. As a result, when the generator is switched from the OFF state of the electric power generation to the ON state of the electric power generation, the above generator output changes discontinuously. When the engine speed is controlled on the basis of the engine output including this discontinuous change of the generator output, the generator output changes as follows: when the electric power generation is frequently switched ON and OFF between the electric power generation OFF (zero output) and the minimum electric power generation torque (electric power generation ON), the engine speed (matching speed) frequently changes at the matching point. There is a problem in that the operator is likely to feel uncomfortable with the change of the engine sound due to the change of the engine speed.

This invention is made in view of the above problems, and it is an object of this invention to provide an engine control device of work machine and engine control method therefor which can suppress change of engine speed even when a generator output discontinuously changes due to ON/OFF of electric power generation by a generator.

Solution to Problem

According to a first aspect of the present inventions in order to solve the above problems and achieve the object, there is provided an engine control device of a work machine including: detection means for detecting a driving state of a work machine using a generator; target engine speed setting means for causing, on the basis of the driving state, a target engine speed set for a case where electric power generation by the generator is OFF to be the same as a target engine speed set for a case where the electric power generation by the generator is ON; and engine target output calculation means for calculating an engine target output during electric power generation OFF that can be output at most when the electric power generation by the generator is OFF, and calculates an engine target output obtained by adding an output corresponding to an electric power generation amount by the generator to the engine target output when the electric power generation by the generator is ON.

According to a second aspect of the present invention, there is provided the engine control device of the work machine according to the first aspect, wherein the target engine speed setting means performs control so that an engine speed does not change until a predetermined electric power generation torque is attained, during transition from the electric power generation OFF to the electric power generation ON.

According to a third aspect of the present invention, there is provided the engine control device of the work machine according to the second aspect, wherein the predetermined electric power generation torque is a minimum electric power generation torque set in advance.

According to a fourth aspect of the present invention, there is provided the engine control device of the work machine according to the first or second aspect further including: electric power generation output calculation means using an engine speed of the engine to obtain the predetermined electric power generation output by the generator; pump absorption horsepower calculation means for setting an absorption horsepower of a hydraulic pump; and auxiliary equipment horsepower calculation means for obtaining a horsepower of auxiliary equipment driving in synchronization with driving of the engine, wherein the target engine speed setting means performs control to set an engine target output corresponding to an output obtained by adding the set pump absorption horsepower, the obtained auxiliary equipment horsepower, and the predetermined electric power generation output by the generator when the electric power generation is OFF, and a target engine speed defined from a target matching route indicating an engine output for driving the engine with a low fuel consumption rate, and performs control so that the engine speed set when the electric power generation is ON becomes the same as the target engine speed.

According to a fifth aspect of the present invention, there is provided an engine control method of a work machine, including: a detection step for detecting a driving state of a work machine using a generator; and a setting step for causing, on the basis of the driving state, a target engine speed set for a case where electric power generation by the generator is OFF to be the same as a target engine speed set for a case where the electric power generation by the generator is ON, calculating and setting an engine target output during electric power generation OFF that can be output at most when the electric power generation by the generator is OFF when the electric power generation by the generator is OFF, and calculating and setting an engine target output obtained by adding an output corresponding to an electric power generation amount by the generator to the engine target output when the electric power generation by the generator is ON.

According to this invention, target engine speeds are set as follows: a target engine speed set for a case where electric power generation by the generator is OFF is the same as a target engine speed set for a case where the electric power generation by the generator is ON, and an engine target output during electric power generation is OFF that can be output at most when the electric power generation by the generator is OFF when the electric power generation by the generator is OFF is calculated, and an engine target output obtained by adding an output corresponding to an electric power generation amount by the generator to the engine target output is set when the electric power generation by the generator is ON, and therefore, even when a generator output changes discontinuously due to ON/OFF of electric power generation by the generator, variation of the engine speed can be suppressed.

DESCRIPTION OF EMBODIMENTS

Hereinafter, an embodiment for carrying out this invention will be explained with reference to appended drawings.

[Entire Configuration]

Figure 1:
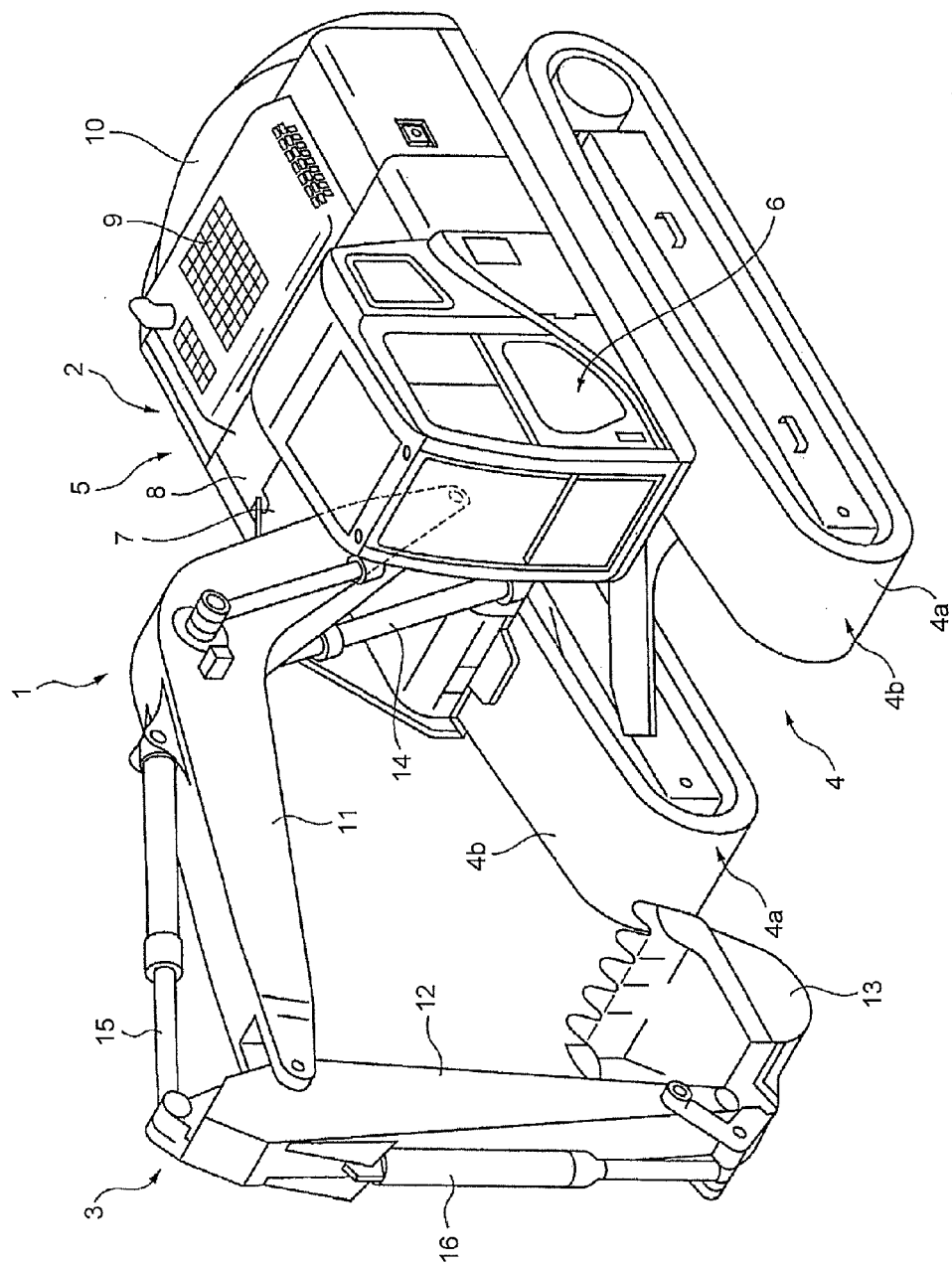
FIG. 1 is a perspective view illustrating entire configuration of a hybrid excavator according to an embodiment of this invention.
Figure 2:
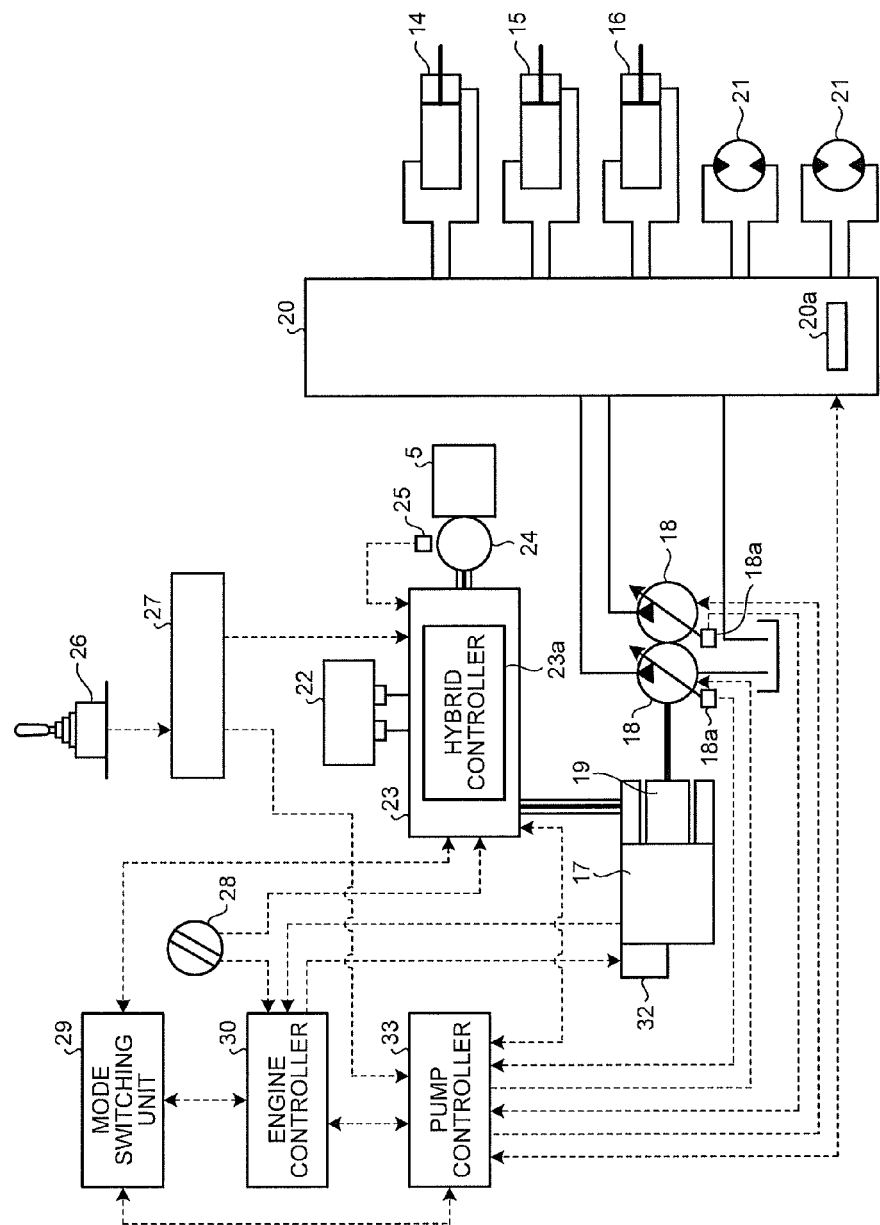
FIG. 2 is a schematic view illustrating a configuration of a control system of a hybrid excavator as illustrated in FIG. 1.

First, FIGS. 1 and 2 illustrate an entire configuration of a hybrid excavator 1 which is an example of a work machine. The hybrid excavator 1 includes a vehicle main body 2 and a working machine 3. The vehicle main body 2 includes a lower running body 4 and an upper swing body 5. The lower running body 4 includes a pair of running devices 4a. Each running device 4a includes a crawler track 4b. Each running device 4a runs or rotates the hybrid excavator 1 by driving the crawler track 4b with a right running motor and a left running motor (running motors 21).

The upper swing body 5 is rotatably provided on the lower running body 4, and rotates when a swing motor 24 drives it. The upper swing body 5 is provided with a cab 6. The upper swing body 5 includes a fuel tank 7, an operating oil tank 8, an engine chamber 9 and a counter weight 10. The fuel tank 7 accumulates fuel for driving an engine 17. The operating oil tank 8 accumulates operating oil which is discharged from a hydraulic pump 18 to a hydraulic cylinder such as a boom cylinder 14 and a hydraulic device such as the running motor 21. The engine chamber 9 accommodates devices such as the engine 17 and the hydraulic pump 18. The counter weight 10 is provided behind the engine chamber 9.

The working machine 3 is attached to a central position at the front of the upper swing body 5, and includes a boom 11, an arm 12, a bucket 13, the boom cylinder 14, an arm cylinder 15, and a bucket cylinder 16. The base end portion of the boom 11 is coupled with the upper swing body 5 in a rotatable manner. The front end portion of the boom 11 is coupled with the base end portion of the arm 12 in a rotatable manner. The front end portion of the arm 12 is coupled with the front end portion of the bucket 13 in a rotatable manner. The boom cylinder 14, the arm cylinder 15, and the bucket cylinder 16 are hydraulic cylinders driven with operating oil discharged from the hydraulic pump 18. The boom cylinder 14 operates the boom 11. The arm cylinder 15 operates the arm 12. The bucket cylinder 16 operates the bucket 13.

In FIG. 2, the hybrid excavator 1 includes the engine 17 serving as a driving source, the hydraulic pump 18, and a generator 19. A diesel engine is used as the engine 17, and a variable displacement hydraulic pump (for example, swash plate hydraulic pump) is used as the hydraulic pump 18. The output shaft of the engine 17 is mechanically coupled with the hydraulic pump 18 and the generator 19, and by driving the engine 17, the hydraulic pump 18 and the generator 19 are driven. It should be noted that the generator 19 may be directly mechanically coupled with the output shaft of the engine 17, or may be rotated and driven via transmission means such as a belt and a chain engaged with the output shaft of the engine 17. The hydraulic driving system includes a control valve 20, the boom cylinder 14, the arm cylinder 15, the bucket cylinder 16, the running motor 21, and the like, and the hydraulic pump 18 serves as a hydraulic source to drive them.

The electric driving system includes a capacitor 22, an inverter 23, and the swing motor 24. The electric power generated by the generator 19 or electric power discharged by the capacitor 22 is provided via an electric power cable to the swing motor 24, which rotates the upper swing body 5. More specifically, the swing motor 24 performs power running action with electric energy provided from (generated by) the generator 19 or electric energy provided by (discharged by) the capacitor 22, thereby performs swing and driving, and when the swing is decelerated, the swing motor 24 performs regeneration action to provide the electric energy to the capacitor 22 (charge the capacitor 22). For example, an SR (switched reluctance) motor is used as the generator 19. The generator 19 is mechanically coupled with the output shaft of the engine 17, and the engine 17 drives and rotates the rotor shaft of the generator 19. For example, an electric double-layer capacitor is used as the capacitor 22. Instead of the capacitor 22, it may be a Nickel-metal hydride battery or a lithium-ion battery. The swing motor 24 is provided with a rotation sensor 25, which detects rotation speed of the swing motor 24, converts it into an electric signal, and outputs the electric signal to a hybrid controller 23a provided within the inverter 23. For example, an interior magnet synchronous motor is used as the swing motor 24. For example, a rotary encoder, a resolver, or the like are used as the rotation sensor 25. The hybrid controller 23a includes, e.g., a CPU (operation device such as a numeric data processor) and a memory (storage device). The hybrid controller 23a receives signals of detection values provided by a temperature sensor such as a thermistor or a thermocouple provided in the generator 19, the swing motor 24, the capacitor 22, and the inverter 23 to manage increase and decrease of the temperature of each device such as the capacitor 22, and performs charge/discharge control of the capacitor 22, electric power generation and engine assist control of the generator 19, and running and regeneration control of the swing motor 24.

The hydraulic driving system and the electric driving system are driven in accordance with manipulation of a manipulation lever 26 such as a working machine lever, a running lever, and a swing lever, provided in the cab arranged in the vehicle main body 2. The amount of manipulation of the manipulation lever 26 is converted by a lever manipulation amount detection unit 27 into an electric signal. The lever manipulation amount detection unit 27 is constituted by a pressure sensor. A pilot hydraulic pressure generated in accordance with manipulation of the manipulation lever is detected by a pressure sensor, and a voltage and the like that is output by the pressure sensor is converted into the amount of manipulation of the lever, whereby the amount of manipulation of the lever is obtained. The amount of manipulation of the lever is output to a pump controller 33 as an electric signal. When the manipulation lever 26 is an electric lever, the lever manipulation amount detection unit 27 is constituted by electric detection means such as a potentiometer, and the voltage and the like generated in accordance with the amount of manipulation of the lever is converted into the amount of manipulation of the lever, and the amount of manipulation of the lever is obtained.

A fuel adjustment dial (throttle dial) 28 and a mode switching unit 29 are provided in the cab 6. The fuel adjustment dial (throttle dial) 28 is a switch for setting the amount of fuel provided into the engine 17, and the setting value of the fuel adjustment dial (throttle dial) 28 is converted into an electric signal and output to an engine controller 30.

The engine controller 30 is constituted by an operation device such as a CPU (numeric data processor) and a memory (storage device). The engine controller 30 generates a signal of a control command on the basis of the setting value of the fuel adjustment dial (throttle dial) 28, and a common rail control unit 32 receives the control signal, and adjusts the amount of fuel injection to the engine 17. More specifically, the engine 17 is an engine capable of electronic control by common rail method, and can give an output for appropriately control the amount of fuel injection, and can freely set the torque that can be output at an engine speed at a certain instance.

The mode switching unit 29 is a portion for setting the work mode of the hybrid excavator 1 to power mode or economy mode, and for example, the mode switching unit 29 is constituted by a manipulation button, a switch, or a touch panel provided in the cab 6. When the operator of the hybrid excavator 1 manipulates the manipulation button and the like, the mode switching unit 29 can switch the work mode. The power mode is a work mode for performing engine control and pump control in such a manner that the fuel-efficiency is reduced while a large amount of work is maintained. The economy mode is a work mode for performing engine control and pump control so as to ensure the operation speed of the working machine 3 during light-load operation while the fuel-efficiency is still more reduced. In the setting with the mode switching unit 29 (switching of the work mode), the electric signal is output to the engine controller 30 and the pump controller 33. In the power mode, the output of the engine 17 and the absorption torque of the hydraulic pump 18 are matched with each other in a region where the engine speed and the output torque of the engine 17 is relatively high. In the economy mode, matching is achieved at a lower engine output as compared with the case of the power mode.

The pump controller 33 receives signals transmitted from the engine controller 30, the mode switching unit 29, and the lever manipulation amount detection unit 27, and generates a signal of a control command for adjusting the amount of the operation oil discharged from the hydraulic pump 18 by controlling inclination of the a swash plate angle. The pump controller 33 receives a signal from a swash plate angle sensor 18a for detecting the swash plate angle of the hydraulic pump 18. By causing the swash plate angle sensor 18a to detect the swash plate angle, the pump capacity of the hydraulic pump 18 can be calculated. Within the control valve 20, a pump-pressure detection unit 20a is provided to detect the pump discharge pressure of the hydraulic pump 18. The detected pump discharge pressure is converted into an electric signal and input into the pump controller 33. The engine controller 30 and the pump controller 33 are connected via a vehicle LAN such as a CAN (Controller Area Network) so as to exchange information with each other.

[Overview of Engine Control]

Figure 3:
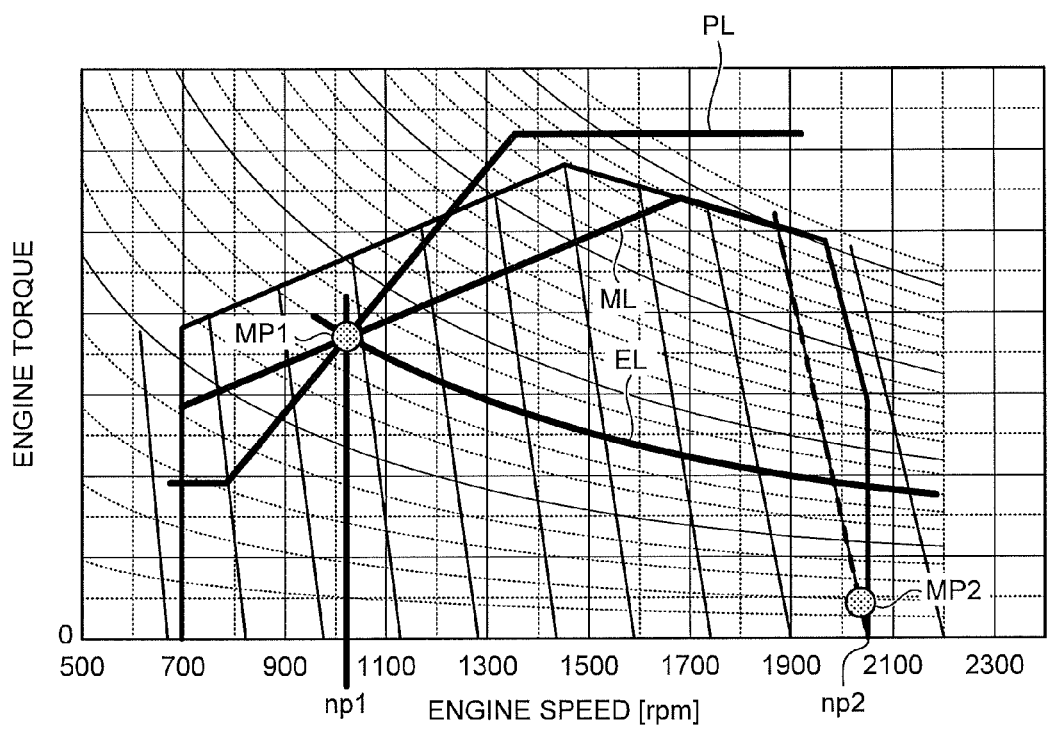
FIG. 3 is a torque line diagram for explaining the contents of engine control by a controller.

First, overview of the engine control will be explained with reference to a torque line diagram as illustrated in FIG. 3. The engine controller 30 obtains information about the amount of manipulation of the lever, work mode, rotation speed, the setting value of the fuel adjustment dial (throttle dial) 28 (signals indicating the state of driving), and obtains the engine output command value. The engine output command value is the equal horsepower curved line (engine output command value curved line) EL in the torque line diagram, and is a curved line for limiting the output of the engine.

When the working machine 3 is not receiving any load, the engine output is not restricted by the droop line, and the engine output and the hydraulic pump output are matched at the crossing point (matching point) MP1 between the engine output command value curved line EL and the pump absorption torque line PL, whereby the working machine 3 is operated. The matching point MP1 is preferably on the target matching route ML. The engine speed at the target matching point MP1 is a target matching engine speed np1, and for example, in FIG. 3, it is around 1000 rpm. Therefore, the working machine 3 can obtain sufficient output, and can reduce the fuel consumption since the engine 17 is driven at a low engine speed.

On the other hand, when the load to the working machine 3 is lost, and the operating oil flow rate to the hydraulic cylinders 14, 15, 16 of the working machine 3 is required, i.e., when the operation speed of the working machine 3 is required to be ensured, the engine controller 30 determines a no-load maximum engine speed np2 (for example, in FIG. 3, around 2050 rpm) corresponding to information such as the amount of manipulation of the lever, the rotation rotational speed of the upper swing body 5, and the setting value of the fuel adjustment dial (throttle dial) 28, and drives the engine 17 by controlling the engine droop within the engine speed range between the target matching engine speed np1 and the no-load maximum engine speed np2. When, by doing such control, the state where the load of the working machine 3 is imposed is changed to the state where no load is imposed, the matching point MP1 at the low rotation side changes to the matching point MP2 at the high rotation side, and therefore, the operating oil flow rate discharged from the hydraulic pump 18 can be sufficiently provided to the hydraulic cylinders 14, 15, 16, and the operation speed of the working machine 3 can be ensured. Since the engine output is limited by the engine output command value curved line EL, useless energy is not wasted. It should be noted that the no-load maximum engine speed np2 is not limited to the maximum engine speed that the engine can output.

Figure 4:
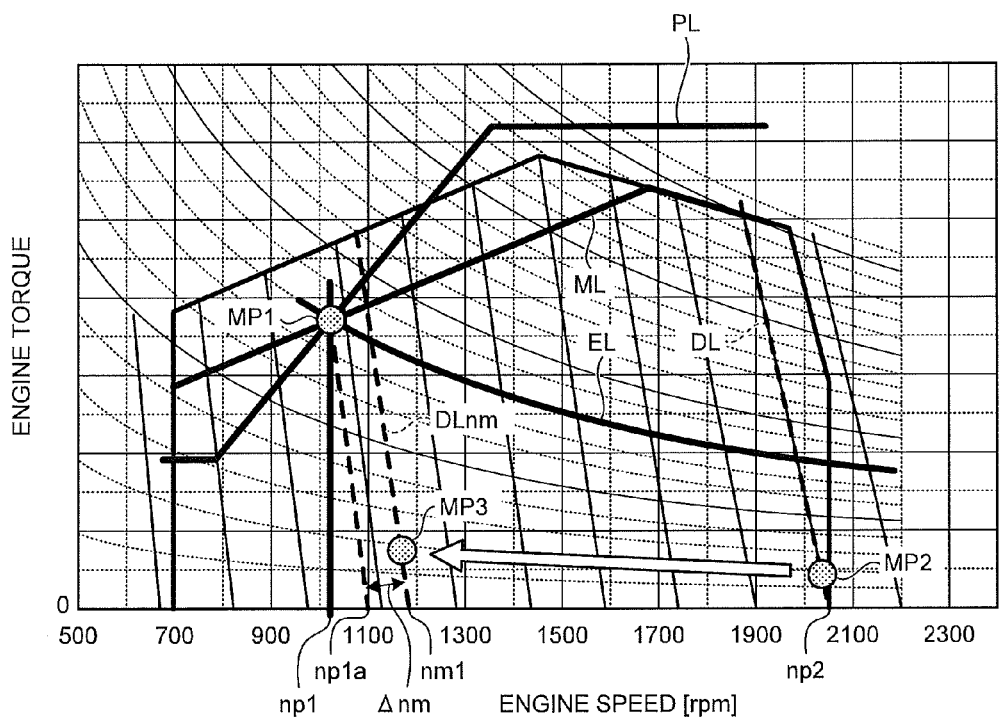
FIG. 4 is a torque line diagram for explaining the contents of engine control by the controller.

In this case, if the load of the working machine 3 is further lost, the engine continuously driven at a high rotation region would consume more fuel, which reduces the fuel-efficiency. Therefore, when the load is lost, and for example, a high discharge flow rate and a high discharge pressure of the operating oil from the hydraulic pump 18 are not required like the operation with only the bucket 13, i.e., the pump capacity is sufficient, control is performed to shift the droop line DL in the high rotation region to the low rotation region as illustrated in FIG. 4. As described above, the pump capacity is detected by the swash plate angle sensor 18a, and the droop line is shifted in accordance with the magnitude of the detection value. For example, when the pump capacity is detected as being more than a predetermined time, the operating oil flow rate is required and therefore, the droop line DL is shifted to the high rotation side to increase the engine speed, and when the pump capacity is detected as being less than the predetermined time, the operating oil flow rate is not required, and therefore, the droop line DL is shifted to the low rotation side to decrease the engine speed. By doing such control, useless fuel consumption due to driving of the engine at the high rotation side can be suppressed.

[Details of Engine Control]

Figure 5:
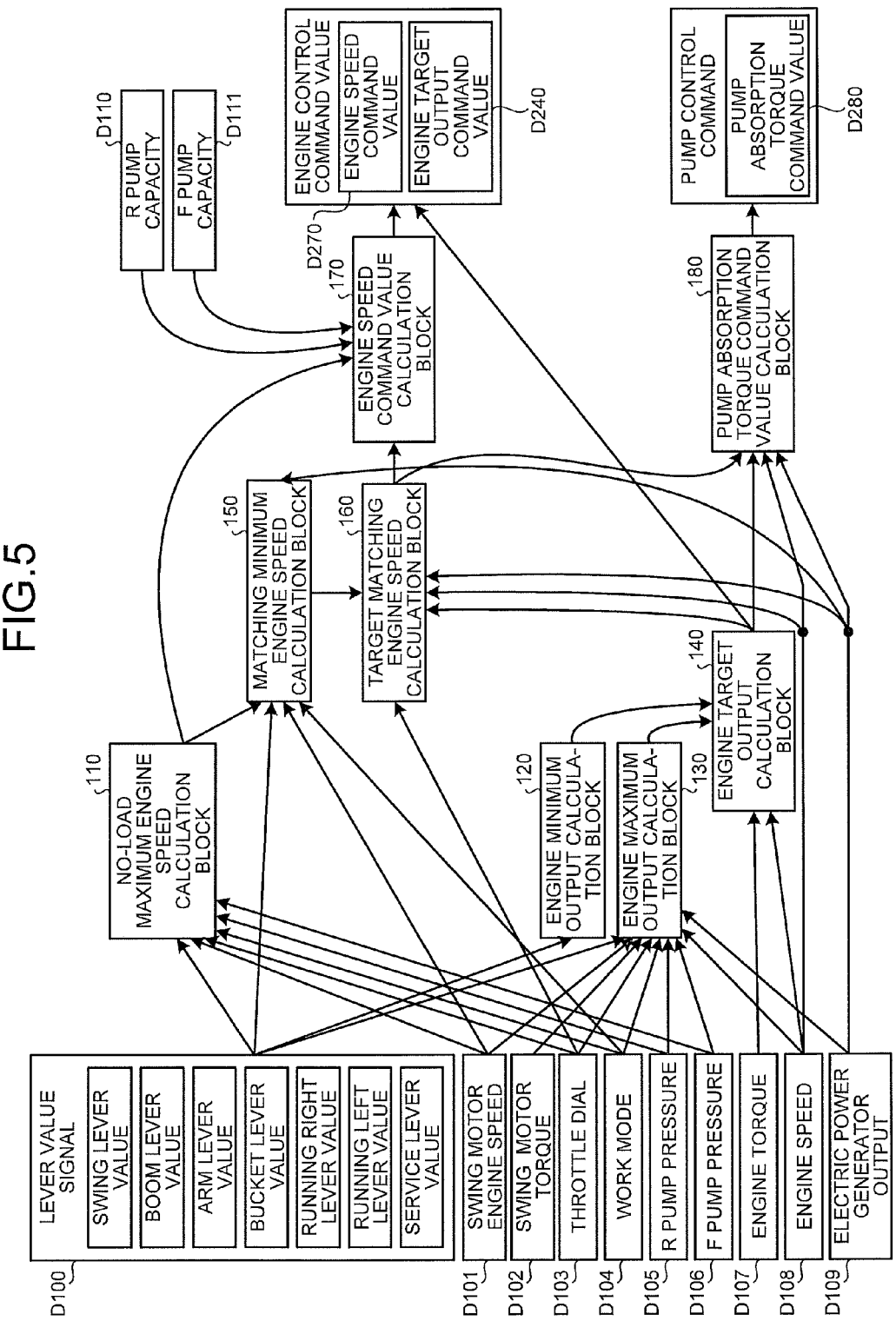
FIG. 5 is a diagram illustrating an overall control flow by the controller.

FIG. 5 illustrates an overall control flow by the engine controller 30 or the pump controller 33. The engine controller 30 or the pump controller 33 ultimately calculates the engine speed command value and the engine output command value which are engine control commands, and calculates the pump absorption torque command value as a pump control command.

Figure 6:
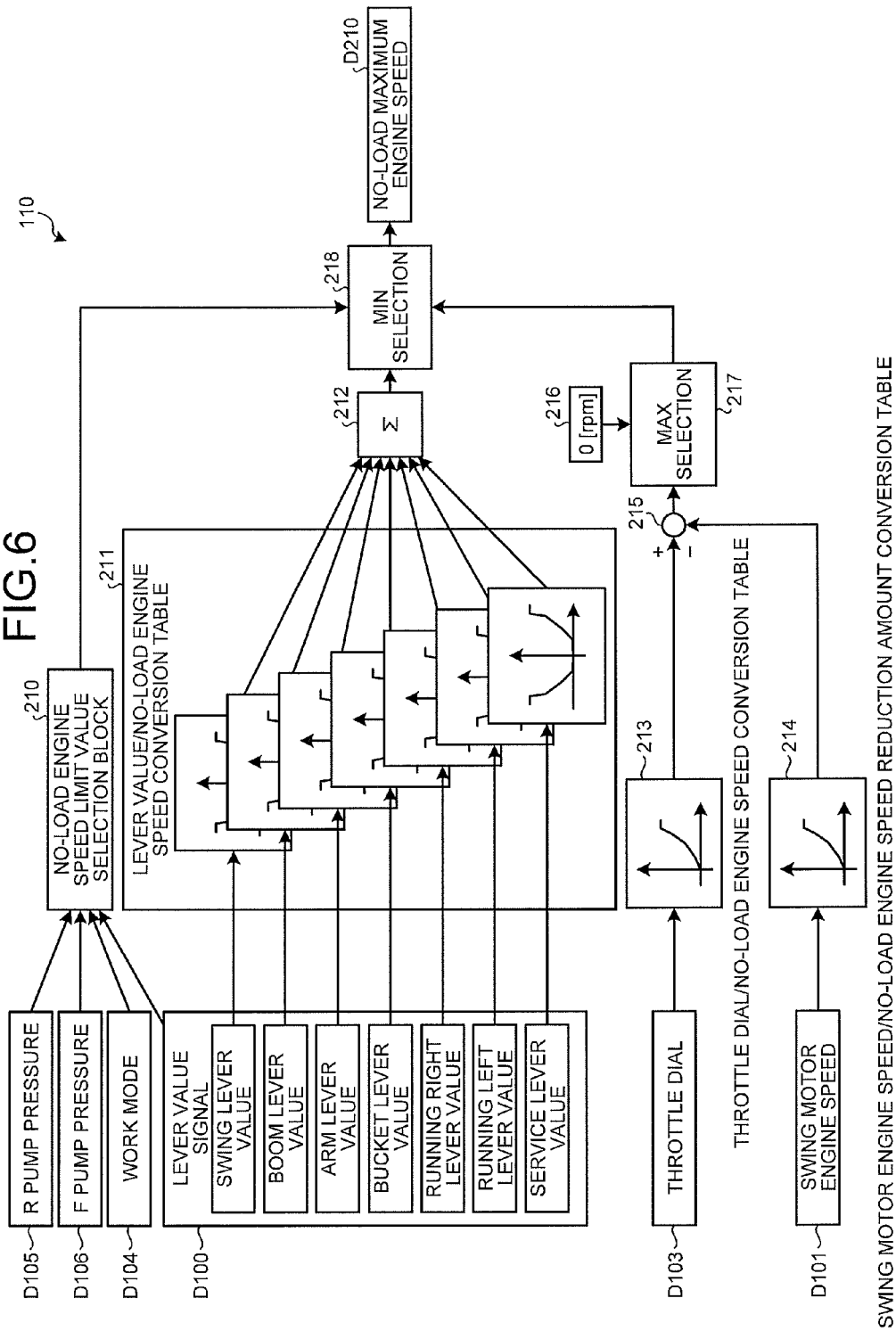
FIG. 6 is a diagram illustrating a detailed control flow of a no-load maximum engine speed calculation block as illustrated in FIG. 5.

A no-load maximum engine speed calculation block 110 calculates, in accordance with the detailed control flow as illustrated in FIG. 6, a no-load maximum engine speed D210 (np2) which is a value of the upper limit value of the engine speed command value. When the pump capacity of the hydraulic pump 18 is the maximum, the flow rate of the hydraulic pump 18 (hydraulic pump discharge flow rate) is a product of the engine speed and the pump capacity, and since the flow rate of the hydraulic pump 18 (hydraulic pump discharge flow rate) is proportional to the engine speed, a no-load maximum engine speed D210 and the flow rate of the hydraulic pump 18 (pump maximum discharge amount) are in proportional relationship. Therefore, first, as a candidate value of the no-load maximum engine speed D210, a total summation of engine speeds obtained from each lever value signal D100 (the amount of manipulation of the lever) is obtained by a total summation unit 212. Each lever value signal D100 (each signal indicating the amount of manipulation of the lever) includes a swing lever value, a boom lever value, an arm lever value, a bucket lever value, a running right lever value, a running left lever value, and a service lever value. This service lever value is a value means a value indicating the amount of manipulation of the lever for manipulating a new hydraulic actuator when a hydraulic circuit is provided to be connected to the new hydraulic actuator. Each lever value signal is converted into a no-load engine speed by a lever value/no-load engine speed conversion table 211 as illustrated in FIG. 6, and a no-load engine speed of the total summation obtained by the total summation unit 212 based on this converted value is output to a minimum value selection unit (MIN selection) 218.

On the other hand, no-load engine speed limit value selection block 210 uses the amount of manipulation of each manipulation lever value signal D100, pump-pressures D105, D106 which are discharge pressures of the hydraulic pump 18, and the work mode D104 set by the mode switching unit 29 to determine what kind of manipulation pattern (work pattern) the operator of the hybrid excavator 1 is currently executing, and selects and determines a no-load engine speed limit value for the manipulation pattern set in advance. The no-load engine speed limit value thus determined is output to the minimum value selection unit 218. The determination of the manipulation pattern (work pattern) is such that, for example, in a case where the arm lever is inclined in the excavation direction, and the pump-pressure is also higher than a certain setting value, the hybrid excavator 1 is determined to execute heavy excavation work, and in a case of a composite manipulation where, e.g., the swing lever is inclined and the boom lever is inclined in an upward direction, the hybrid excavator 1 is determined to execute hoist swing work. As described above, the determination of the manipulation pattern (work pattern) is estimation of the manipulation that is executed by the operator at that moment. It should be noted that the hoist swing work is a work in which earth and sand excavated by the bucket 13 is raised with the boom 11 raised, and the upper swing body 5 is swung, and the earth and sand in the bucket 13 is discharged at a desired rotation stop position.

On the other hand, the candidate value of the no-load maximum engine speed is determined also from the setting state (setting value) of the fuel adjustment dial 28 (throttle dial D103). More specifically, upon receiving a signal indicating the setting value of the fuel adjustment dial 28 (throttle dial D103), the setting value is converted into a candidate value of a no-load maximum engine speed by a throttle dial/no-load engine speed conversion table 213 and is output to the minimum value selection unit 218.

In this case, the hybrid excavator 1 having the electric swing motor 24 does not need any hydraulic pressure as the driving source of rotation. For this reason, among the operating oil discharged from the hydraulic pump 18, the operating oil discharge flow rate from the hydraulic pump 18 for driving the rotation may be reduced. Therefore, a no-load engine speed reduction amount obtained by a swing motor engine speed/no-load engine speed reduction amount conversion table 214 from a swing motor engine speed D101 is subtracted by a subtraction unit 215 from the no-load engine speed obtained by the throttle dial/no-load engine speed conversion table 213 from the setting value of the fuel adjustment dial 28 (throttle dial D103), and the obtained engine speed is adopted as a candidate value of the no-load maximum engine speed D210. It should be noted that a maximum value selection unit (MAX selection) 217 is as follows: the maximum value selection unit 217 performs maximum value selection with a zero value 216 so as not to give a negative value to the minimum value selection unit 218, so that the following case is prevented: when the no-load engine speed reduction amount is more than the no-load maximum engine speed obtained from the setting value of the fuel adjustment dial 28 (throttle dial D103), the value given to the maximum value selection unit 217 becomes a negative value, and the no-load maximum engine speed becomes a negative value as a result of passing the minimum value selection unit (MIN selection) 218 for performing comparison with the no-load engine speed limit value that is output by the no-load engine speed limit value selection block 210.

The minimum value selection unit 218 selects the minimum value from the three values of the no-load engine speeds obtained from the setting value of the throttle dial D103 in view of the no-load engine speed obtained from the lever value signal D100, the no-load engine speed limit value obtained by the no-load engine speed limit value selection block 210, and the no-load engine speed limit value obtained from the swing motor engine speed D101, and outputs the no-load maximum engine speed D210 (np2).

Figure 7:
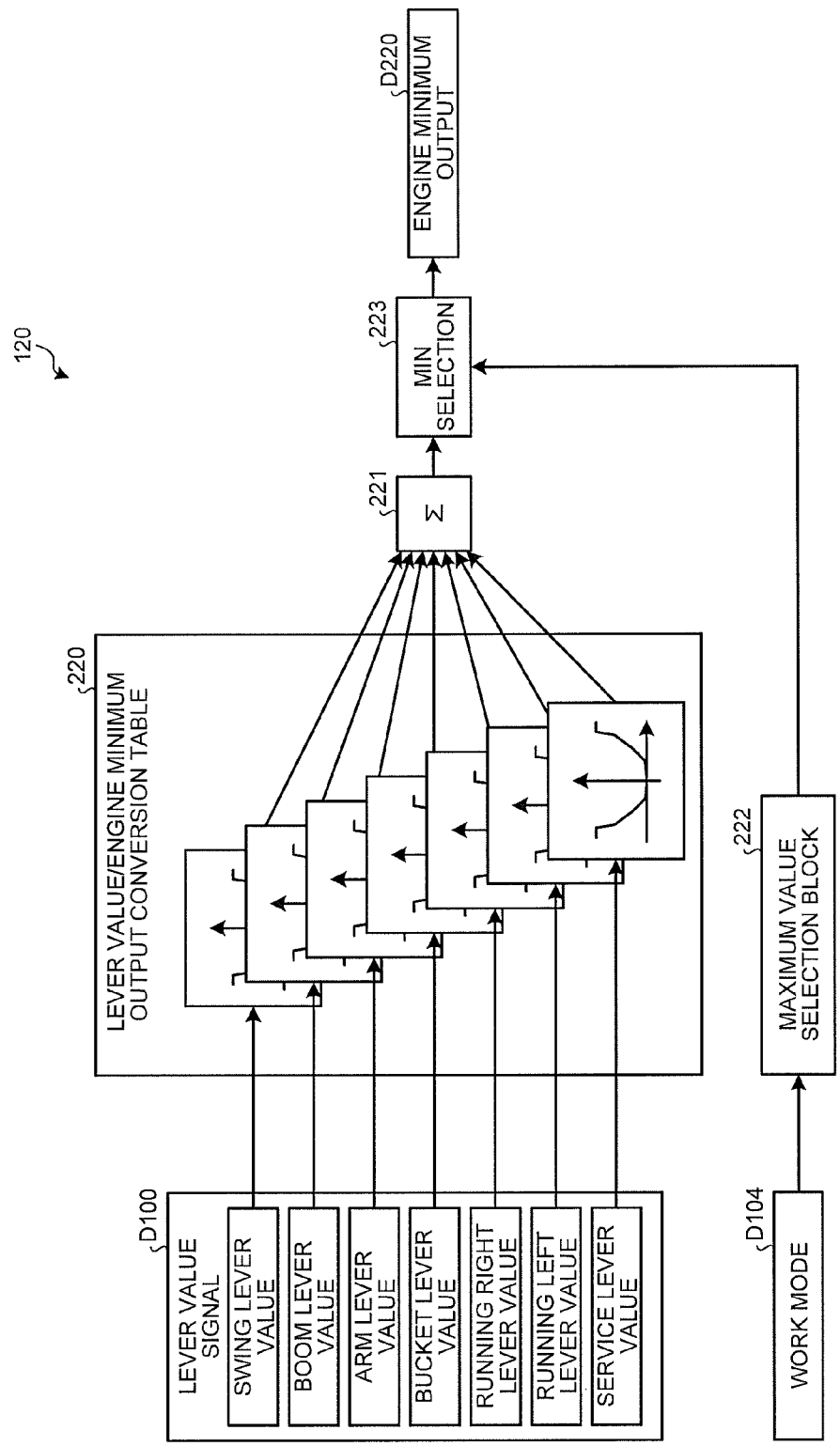
FIG. 7 is a diagram illustrating a detailed control flow of an engine minimum output calculation block as illustrated in FIG. 5.

FIG. 7 is a detailed control flow of an engine minimum output calculation block 120. As illustrated in FIG. 7, the engine minimum output calculation block 120 calculates an engine minimum output D220 which is the value of the minimum of the engine output command value. Like the calculation of the no-load maximum engine speed, a lever value engine minimum output conversion table 220 converts each lever value signal D100 into an engine minimum output, and the total summation unit 221 outputs the total summation thereof to a minimum value selection unit (MIN selection) 223.

On the other hand, a maximum value selection block 222 of the engine minimum output outputs an upper limit value corresponding to the work mode D104 set by the mode switching unit 29 to the minimum value selection unit 223. The minimum value selection unit 223 compares the total summation of the engine minimum output corresponding to each lever value signal D100 and the upper limit value corresponding to the work mode D104, and selects the minimum value and outputs it as the engine minimum output D220.

Figure 8:
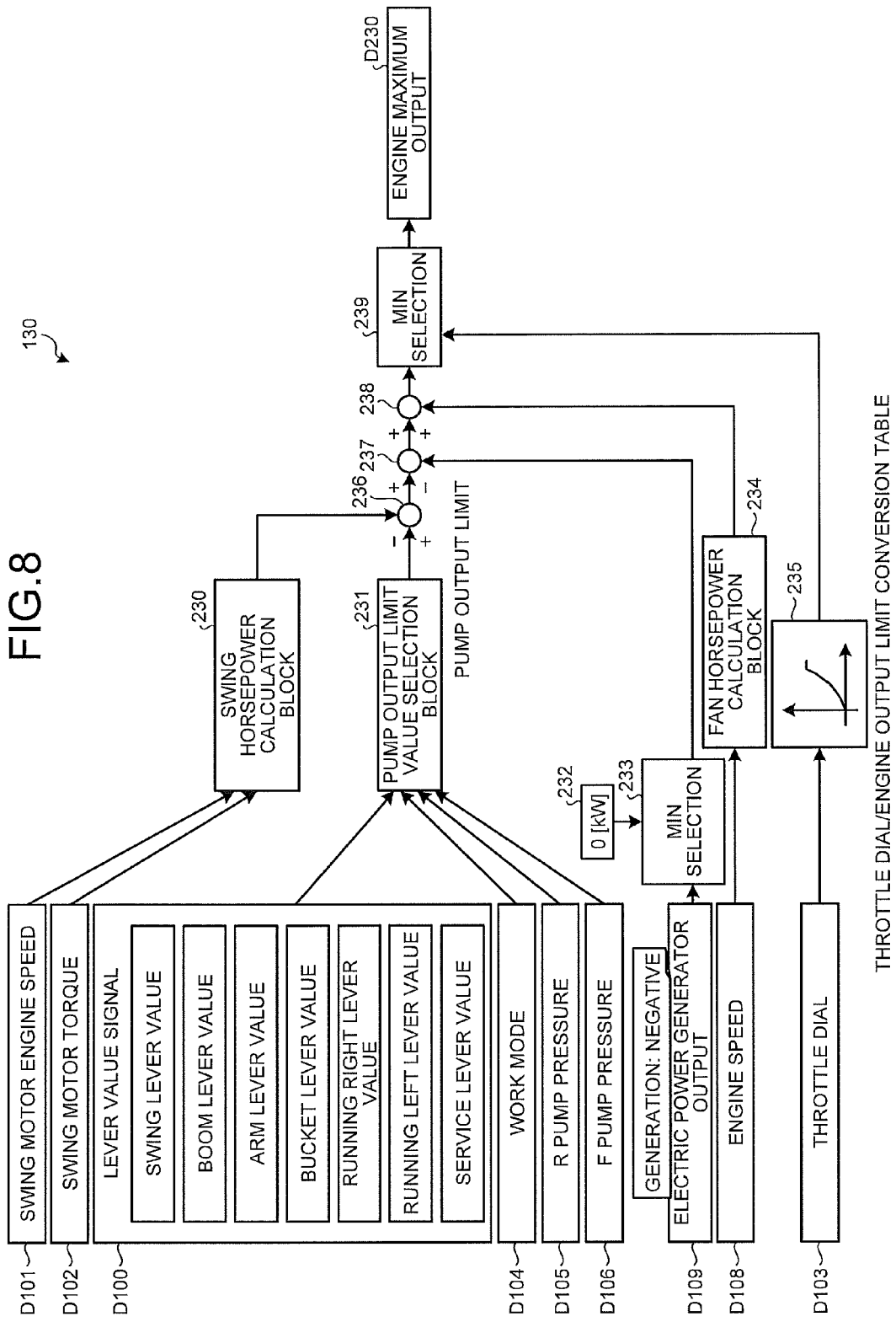
FIG. 8 is a diagram illustrating a detailed control flow of an engine maximum output calculation block as illustrated in FIG. 5.

FIG. 8 is a detailed control flow of an engine maximum output calculation block 130. As illustrated in FIG. 8, the engine maximum output calculation block 130 calculates an engine maximum output D230 which is a value of the upper limit of the engine output command value. Like the calculation of the no-load maximum engine speed calculation block 110, a pump output limit value selection block 231 uses information about the amount of manipulation of each lever value signal D100, the pump-pressures D105, D106, and the setting value of the work mode D104 to determine the current manipulation pattern, and selects the pump output limit value for each manipulation pattern thereof. This selected pump output limit value is added by an adding unit 238 with a fan horsepower calculated by a fan horsepower calculation block 234 from the engine speed D108 detected by the engine speed sensor, not illustrated. Using the swing motor engine speed D101 and the swing motor torque D102 as input parameters, and a swing horsepower calculation block 230 calculates the swing horsepower, and using the engine speed D108, the fan horsepower calculation block 234 calculates the fan horsepower. The swing horsepower and the fan horsepower are added to a pump output limit value via each of a subtraction unit 237 and the adding unit 238, respectively. The generator output D109 of the generator 19 is added to the pump output limit value via the subtraction unit 237. These added values (hereinafter, added values) and the engine output limit value converted by a throttle dial/engine output limit conversion table 235 in accordance with the setting value of the fuel adjustment dial 28 (throttle dial D103) are output to a minimum value selection unit (MIN selection) 239. The minimum value selection unit 239 selects the minimum value of the added values and the engine output limit value, and outputs it as the engine maximum output D230. It should be noted that the pump output limit means the pump absorption horsepower. When the generator output D109 is zero, the electric power generation is in OFF state, and as a result, an engine target output D240 obtained by an engine target output calculation block 140 is a value obtained by adding the fan horsepower obtained by the fan horsepower calculation block 234 to the pump absorption horsepower which is output from an operation device 237.

It should be noted that the swing horsepower can be obtained by calculating the following expression, swing horsepower (kW)=2π÷60×swing motor engine speed×swing motor torque÷1000×coefficient (setting value). It should be noted that the fan is a fan (auxiliary equipment) provided in proximity to a radiator for cooling the engine 17, and the fan blows air to the radiator, and is rotated and driven in synchronization with driving of the engine 17. In addition to the fan horsepower, calculation may be performed by adding an air conditioner horsepower (air conditioner horsepower) of an air conditioner (auxiliary equipment) rotated and driven in synchronization with driving of the engine 17. It should be noted that the air conditioner is air-conditioning equipment for air conditioning in the cab 6. It should be noted that the fan horsepower can be obtained by simplified calculation using the following expression, fan horsepower=fan rated horsepower×(engine speed/engine speed when the fan is at rated speed) ^ 3. It should be noted that the swing horsepower and the generator output are added to the pump output limit value is subtraction as illustrated in FIG. 8. The hybrid excavator 1 uses the swing motor 24 electrically driven by the driving source of electricity, which is different from the driving source of the engine 17, and therefore, it is necessary to obtain the swing horsepower and subtract the value of the swing from the pump output limit value. When the generator 19 generates electric power, the generator output is defined such that the value has a negative sign, and a minimum value selection unit 233 compares it with the zero value 232, and a negative value is subtracted from the pump output limit value, and therefore, this is substantially addition. When the generator 19 assists the output of the engine 17, the value of the generator output has a positive sign. When the generator 19 generates electric power, the generator output is a negative value, and therefore, after the minimum value selection with the zero value 232 is performed, the negative generator output is subtracted from the pump output limit, and the generator output is substantially added to the pump output limit. More specifically, only when the generator output D109 is a negative value, addition is performed. The generator 19 assists the engine 17 in order to enhance the responsiveness of the working machine 3 when it is necessary to increase the engine speed from a predetermined engine speed to a higher engine speed, but when the output for assisting the engine 17 is omitted as the engine output at this moment, the responsiveness of the working machine 3 is not achieved, and therefore, even though the engine 17 is assisted, the engine maximum output is not reduced. More specifically, even if the positive generator output is input into the minimum value selection unit 233, the minimum value selection with the zero value 232 is done, whereby zero is output from the minimum value selection unit 233, and the engine maximum output D230 is obtained without subtraction from the pump output limit is not done.

Figure 9:
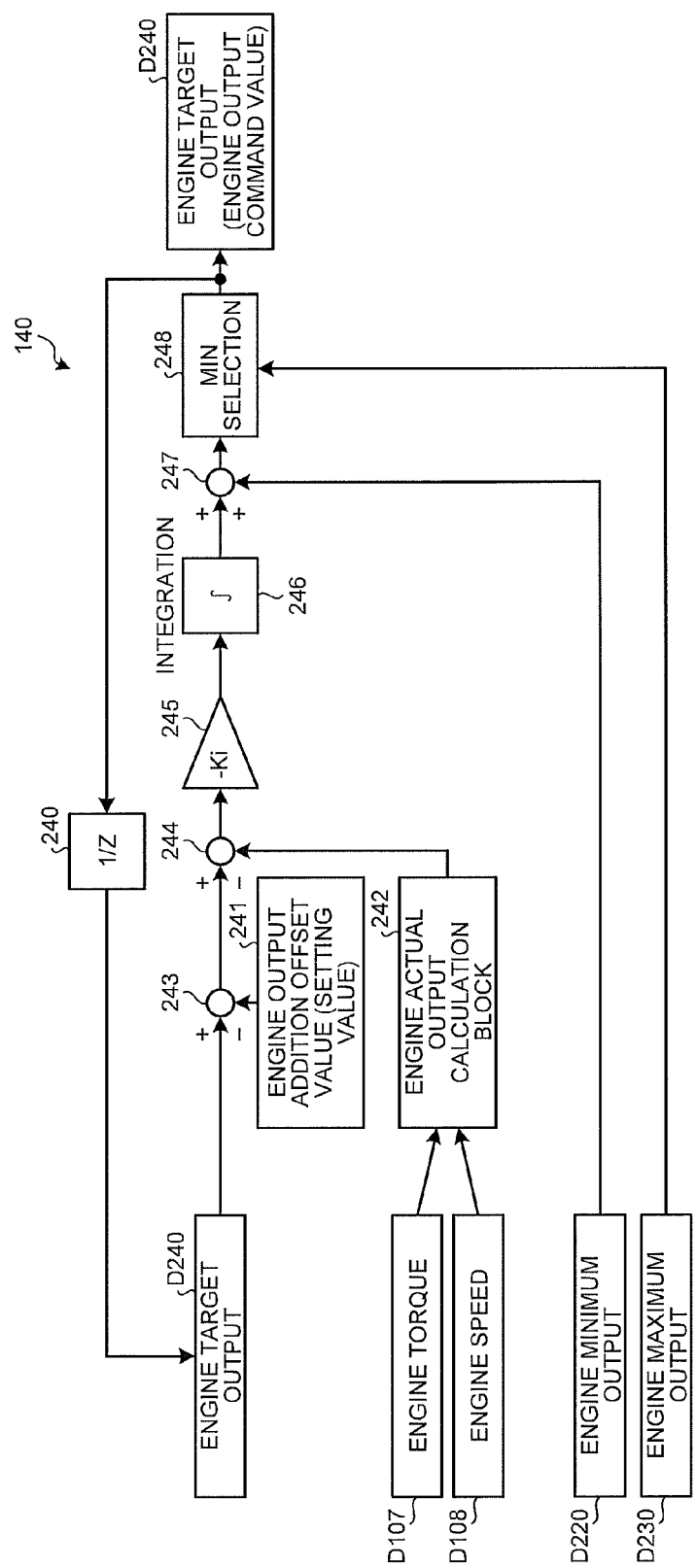
FIG. 9 is a diagram illustrating a detailed control flow of an engine target output calculation block as illustrated in FIG. 5.

FIG. 9 is a detailed control flow of the engine target output calculation block 140. As illustrated in FIG. 9, the engine target output calculation block 140 calculates the engine target output D240. A subtraction unit 243 subtracts an engine output addition offset value 241 set as a fixed value from the previous engine target output D240 previously-calculated. A subtraction unit 244 obtains a deviation that is obtained by subtracting an engine actual output calculated by an engine actual output calculation block 242 from this subtracted value. A multiplication unit 245 multiplies this deviation by a value which is obtained by multiplying a certain gain (−Ki), and an integration unit 246 integrates this multiplied value. An adding unit 247 adds the engine minimum output D220, which is obtained and calculated by the engine minimum output calculation block 120, to the integration value. A minimum value selection unit (MIN selection) 248 outputs a minimum value of any one of the added value and the engine maximum output D230 obtained and calculated by the engine maximum output calculation block 130, and outputs the minimum value as the engine target output D240. As illustrated in FIG. 5, the engine target output D240 is used as the engine output command value of the engine control command, and the engine target output D240 means the engine output command value curved line EL as illustrated in FIG. 3 or 4. The engine actual output calculation block 242 performs calculation based on the amount of fuel injection and the engine speed commanded by the engine controller 30, the engine torque D107 predicted from an atmospheric temperature and the like, the engine speed D108 detected by an engine speed sensor, not illustrated, using the following expression, engine actual output (kW)=2π÷60×engine speed×engine torque 1000, and obtains the engine actual output.

Figure 10:
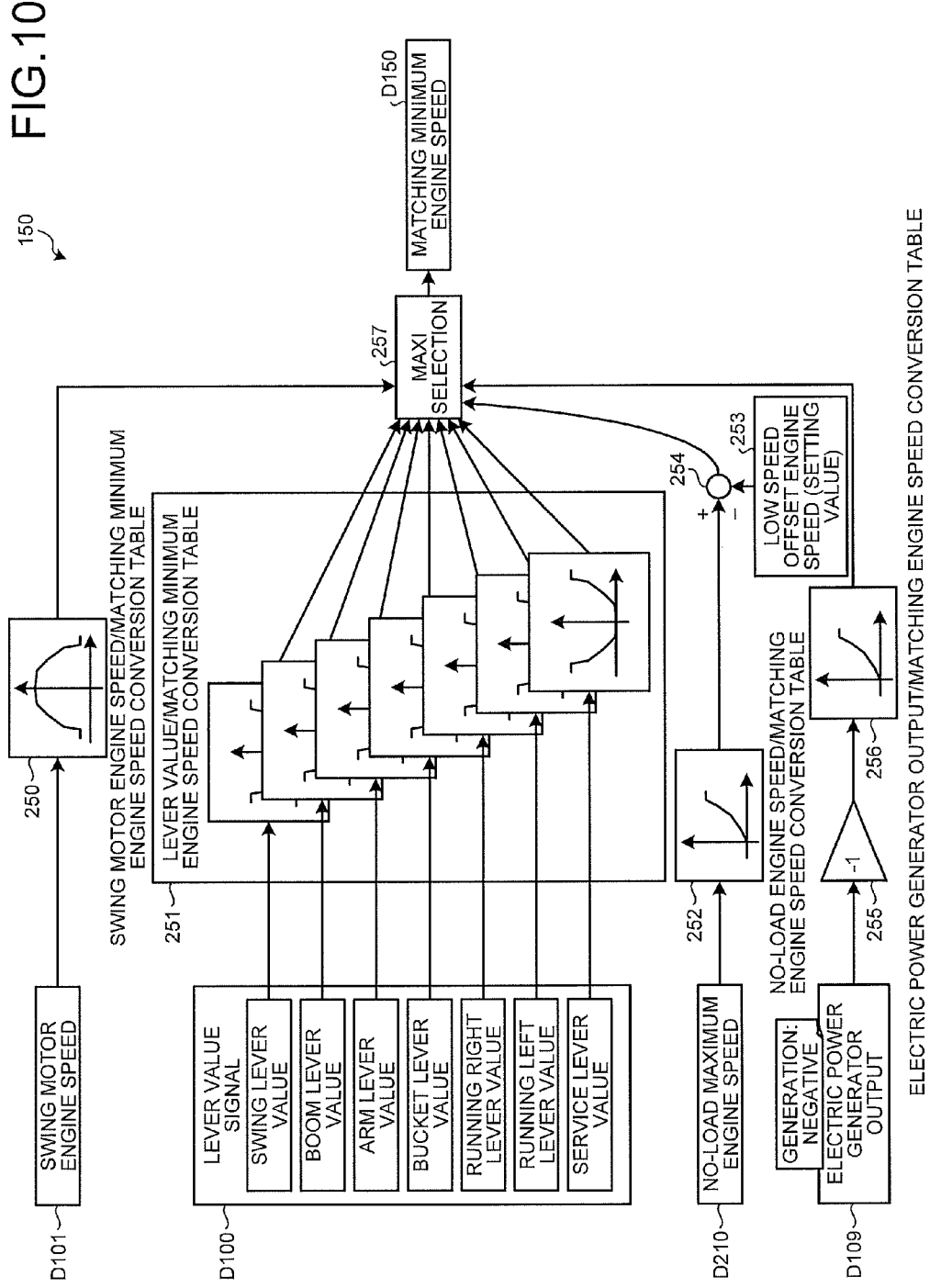
FIG. 10 is a diagram illustrating a detailed control flow of a matching minimum engine speed calculation block as illustrated in FIG. 5.

FIG. 10 is a detailed control flow of a matching minimum engine speed calculation block 150. As illustrated in FIG. 10, the matching minimum engine speed calculation block 150 calculates a matching minimum engine speed D150 which is the engine speed that should be at least increased during work. The matching minimum engine speed D150 is such that each value obtained by converting each lever value signal D100 with a lever value/matching minimum engine speed conversion table 251 is adopted as a candidate value of the matching minimum engine speed D150, which is output to each maximum value selection unit (MAX selection) 257.

Figure 14:
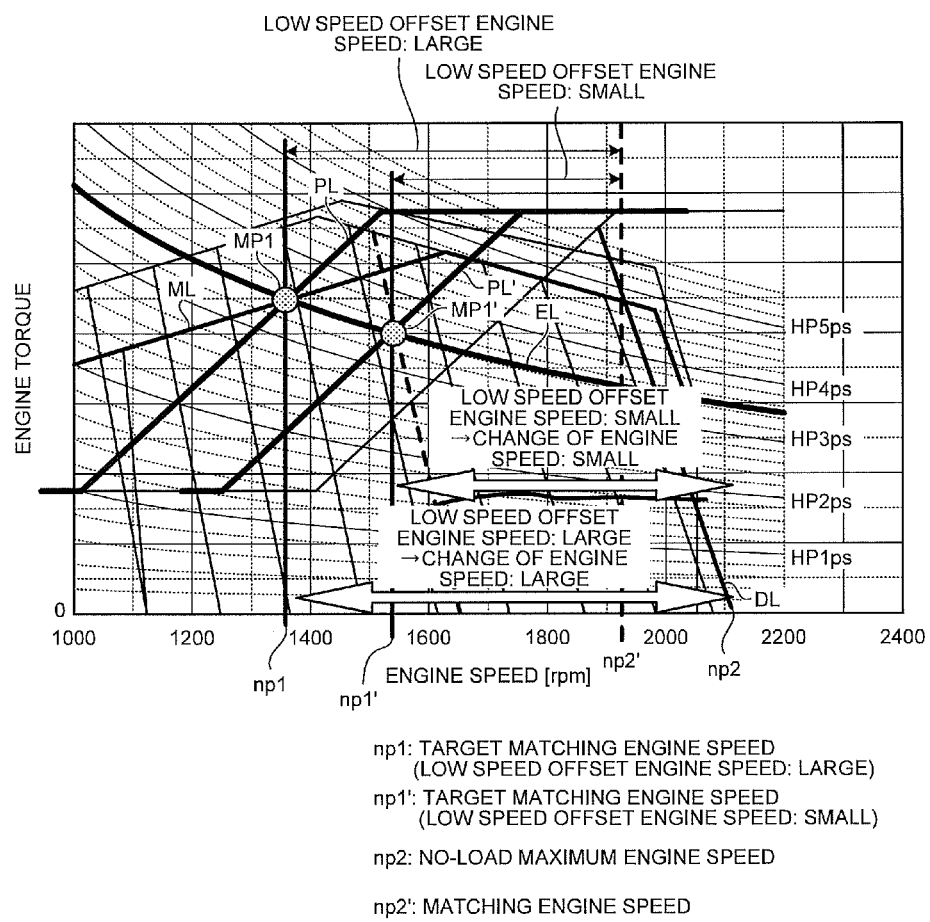
FIG. 14 is a torque line diagram for explaining the contents of engine control by a controller.

On the other hand, a no-load engine speed/matching engine speed conversion table 252 is such that, like the target matching engine speed np1, the engine speed at the crossing point of the droop line DL and the target matching route ML crossing at the no-load maximum engine speed np2 is adopted as a matching engine speed np2', and the no-load maximum engine speed D210 (np2) obtained by the no-load maximum engine speed calculation block 110 is converted and output (see FIG. 14). Further, a low speed offset engine speed is subtracted from the matching engine speed np2', and the value obtained as the result is output to the maximum value selection unit (MAX selection) 257 as a candidate value of the matching minimum engine speed D150. The reason why the low speed offset engine speed is used and the magnitude of the value will be explained later in detail.

A swing motor engine speed/matching minimum engine speed conversion table 250 is such that the swing motor engine speed D101 is converted as a candidate value of the matching minimum engine speed D150 and is output to the maximum value selection unit 257. The swing motor engine speed D101 is a value obtained by detecting the swing motor engine speed (speed) of the swing motor 24 of FIG. 2 using a rotation sensor such as a resolver and a rotary encoder. As illustrated in FIG. 10, the swing motor engine speed/matching minimum engine speed conversion table 250 is such that when the swing motor engine speed D101 is zero, the matching minimum engine speed is increased, and the conversion of the swing motor engine speed D101 is performed in such characteristics that as the swing motor engine speed D101 increases, the matching minimum engine speed is decreased.

In this case, the generator 19 has setting of the limitation value of the torque that can be output at the maximum (generator maximum torque), and therefore, in order to generate electric power with a certain degree of high output, it is necessary to increase the engine speed. For this reason, the engine speed that should be at least increased is obtained using a generator output/matching engine speed conversion table 256 from the magnitude of the generator output that is required as necessary, and this engine speed thus obtained is output to the maximum value selection unit (MAX selection) 257 as a candidate value of the matching minimum engine speed D150. Since the generator output D109 is negative, a gate 255 provided at a stage downstream of the generator output D109 is provided to convert the generator output D109 to a positive value.

The maximum value selection unit 257 selects the maximum value of these matching minimum engine speeds, and outputs it as the matching minimum engine speed D150.

In this case, when the load is lost in this embodiment, the engine speed increases to the no-load maximum engine speed np2 at most, and when the load is sufficiently applied, the engine speed decreases to the target matching engine speed np1. In this case, the engine speed is greatly changed in accordance with the magnitude of the load. The operator of the hybrid excavator 1 may feel uncomfortable with this great change of the engine speed (feeling of lack of power) as if the power of the hybrid excavator 1 is not obtained. Therefore, as illustrated in FIG. 14, the sense of discomfort can be removed by changing the width of change of the engine speed in accordance with the magnitude of the low speed offset engine speed thus set, using the low speed offset engine speed. More specifically, when the low speed offset engine speed is decreased, the width of change of the engine speed is decreased, and when the low speed offset engine speed is increased, the width of change of the engine speed is increased. Even if the width of change of the engine speed is the same, how the operator feels uncomfortable may be different in accordance with the state of operation of the hybrid excavator 1 such as the state of rotation of the upper swing body 5 and the state of excavation work of the working machine 3. As compared with a state where the working machine 3 is doing excavation work, in a state where the upper swing body 5 is swung, the operator is less likely to feel that the power is insufficient even if the engine speed is somewhat reduced, and therefore, in the state where the upper swing body 5 is swung, no problem would be caused by setting the engine speed at a level lower than the state where the working machine 3 is doing excavation work. In this case, the engine speed decreases, and therefore, the fuel-efficiency is improved. This is not limited to only the swing, and such setting of the width of change of the engine speed can also be achieved in accordance with operation of other actuators.

Figure 21:
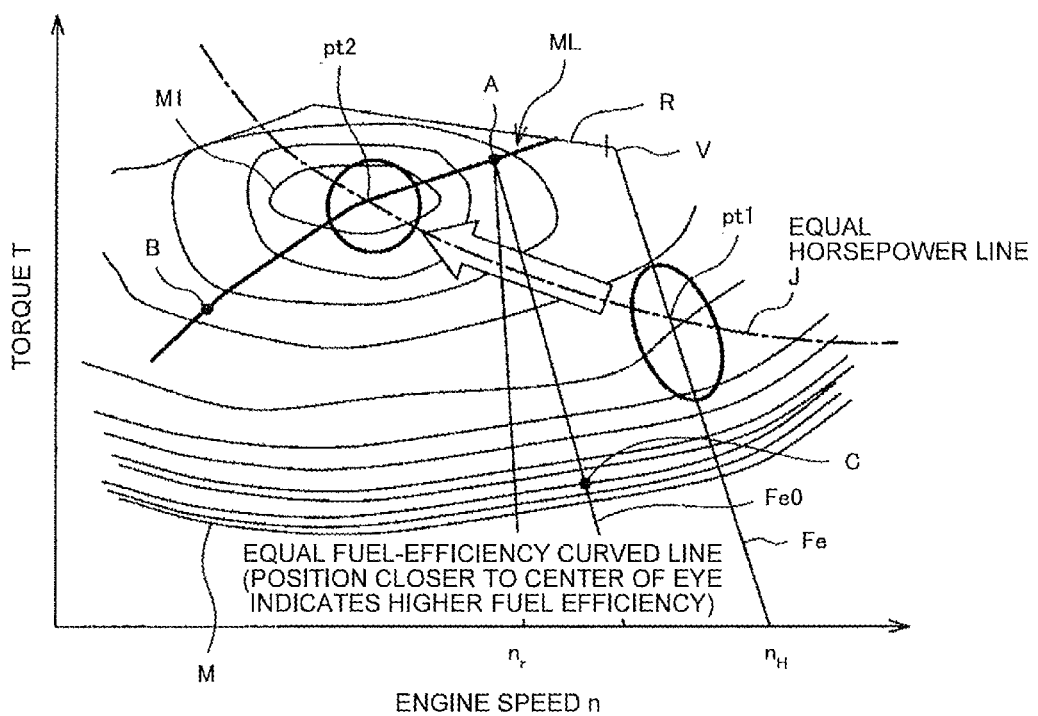
FIG. 21 is a torque line diagram for explaining conventional engine control using a target matching route.

The torque line diagram as illustrated in FIG. 14 will be explained as a supplementary explanation. HP1 to HP5 in the graph as illustrated in FIG. 14 correspond to the equal horsepower line J as illustrated in FIG. 21, and ps denotes a horsepower unit (ps), and the horsepower increases from HP1 to HP5, and five curved lines are illustrated as examples. The equal horsepower curved line (engine output command value curved line) EL is obtained and set in accordance with the engine output command value required. Therefore, the equal horsepower curved line (engine output command value curved line) EL is not limited to five cases of HP1 to HP5, and numerous number of lines exist, and selection is made therefrom. FIG. 14 illustrates a case where the equal horsepower curved line (engine output command value curved line) EL of which horsepower is a horsepower between HP3 ps and HP4 ps is obtained and set.

Figure 11:
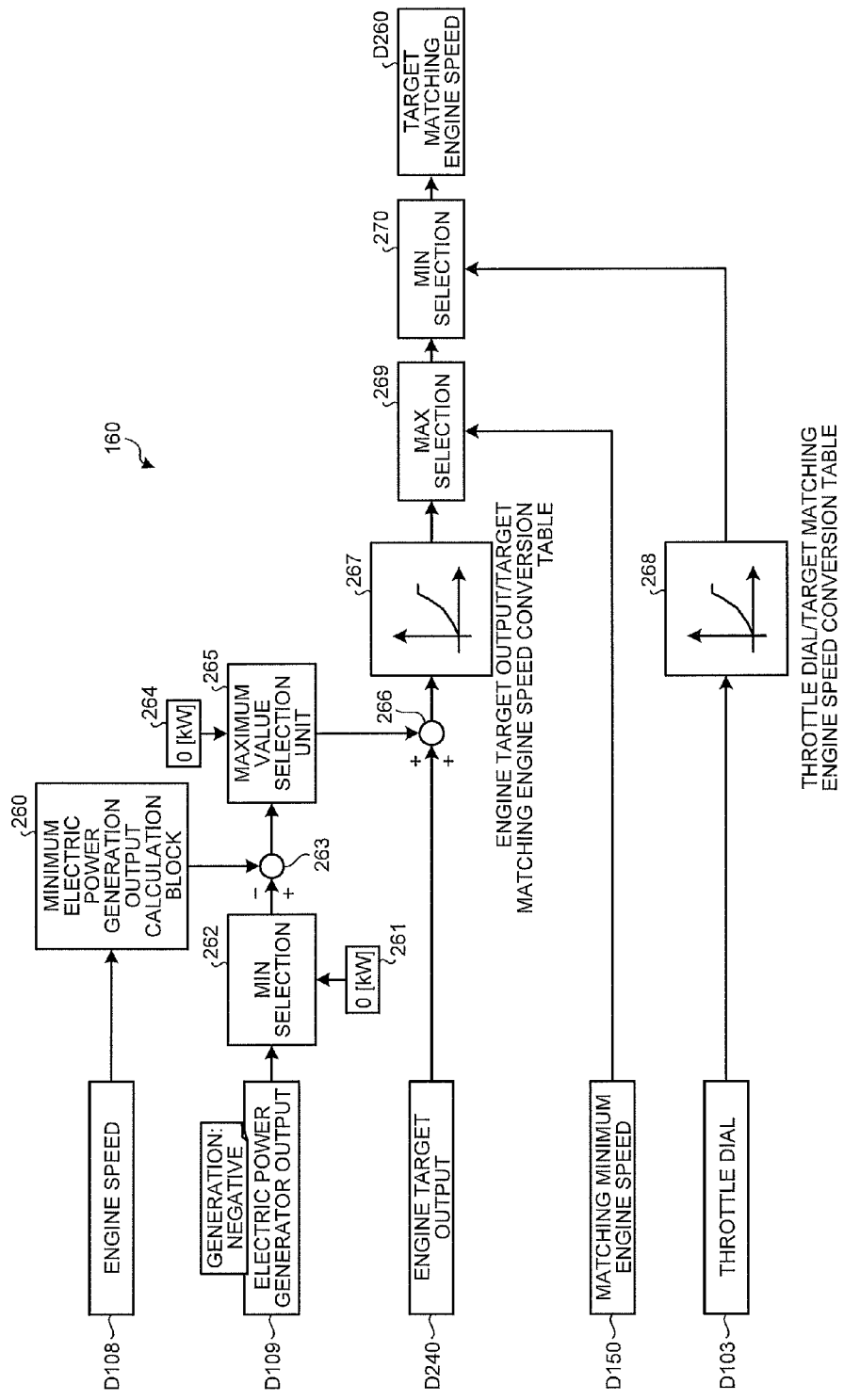
FIG. 11 is a diagram illustrating a detailed control flow of a target matching engine speed calculation block as illustrated in FIG. 5.

FIG. 11 is a detailed control flow of a target matching engine speed calculation block 160. As illustrated in FIG. 11, the target matching engine speed calculation block 160 calculates the target matching engine speed np1 (D260) as illustrated in FIG. 3. The target matching engine speed D260 is an engine speed where the engine target output D240 (engine output command value curved line EL) and the target matching route ML cross. The target matching route ML is set to pass points where the fuel consumption rate is high when the engine 17 operates with a certain level of engine output, and therefore, the target matching engine speed D260 is preferably determined at a crossing point on this target matching route ML with the engine target output D240. For this reason, an engine target output/target matching engine speed conversion table 267 is such that the engine target output D240 (engine output command value curved line EL) obtained by the engine target output calculation block 140 is received, and the target matching engine speed at the crossing point of the engine target output D240 (engine output command value curved line EL) and the target matching route ML is obtained, and is output to a maximum value selection unit (MAX selection) 269.

However, according to the operation performed by the matching minimum engine speed calculation block 150 as illustrated in FIG. 10, when the width of change of the engine speed is reduced, the matching minimum engine speed D150 is more than the matching engine speed obtained by the engine target output/target matching engine speed conversion table 267. For this reason, the maximum value selection unit (MAX selection) 269 compares the matching minimum engine speed D150 and the matching engine speed obtained from the engine target output D240, and selects the maximum value and adopts it as a candidate value of the target matching engine speed D260, thereby limiting the lower limit of the target matching engine speed. In FIG. 14, when the low speed offset engine speed is small, the target matching point is not MP1 but is MP1' although out of the target matching route ML, and the target matching engine speed D260 is not np1 but is np1'. Like the no-load maximum engine speed D210 obtained by the no-load maximum engine speed calculation block 110, the upper limit of the target matching engine speed D260 is limited also by the setting value of the fuel adjustment dial 28 (throttle dial D103). More specifically, a throttle dial/target matching engine speed conversion table 268 is such that the setting value of the fuel adjustment dial 28 (throttle dial D103) is received, and a candidate value of the target matching engine speed D260 converted into the matching engine speed of the crossing point of the target matching route ML and the droop line corresponding to the setting value of the fuel adjustment dial 28 (throttle dial D103) (droop line that can be drawn from the engine speed corresponding to the setting value of the fuel adjustment dial 28 (throttle dial D103) on the torque line diagram) is output, and the candidate value of the target matching engine speed D260 thus output and the candidate value of the target matching engine speed D260 selected by the maximum value selection unit 269 are compared by a minimum value selection unit (MIN selection) 270, and the minimum value is selected, so that the ultimate target matching engine speed D260 is output.

In this case, the target matching engine speed D260 is basically the engine speed at the crossing point of the engine target output and the target matching route ML, but as illustrated in FIG. 8, the engine maximum output D230 is a value obtained by adding the fan horsepower and the generator output to the pump output limit value, and using this engine maximum output D230, the engine target output D240 is determined as illustrated in FIG. 9. Further, as illustrated in FIG. 11, the engine target output D240 is input into the target matching engine speed calculation block 160, and the target matching engine speed D260 is determined. The value of the target matching engine speed D260 is changed in accordance with the generator output D109 requested by the generator 19.

In this case, the generator 19 is not efficient when electric power is generated with a small electric power generation torque. For this reason, when the generator 19 generates electric power, the generator 19 is controlled to generate electric power with a torque equal to or more than the minimum electric power generation torque set in advance. As a result, when the generator 19 changes the state from the state where the generator 19 does not generate electric power (electric power generation OFF) to the state where the generator 19 generates electric power (electric power generation ON), the ON/OFF state of the electric power generation is switched at the minimum electric power generation torque, and the generator output discontinuously changes. More specifically, the matching point is determined at the crossing point of the engine target output D240 and the target matching route ML, and therefore, in accordance with discontinuous change of the generator output D109, target matching engine speed D260 greatly changes with the switching of the ON/OFF state of the electric power generation.

Figure 15:
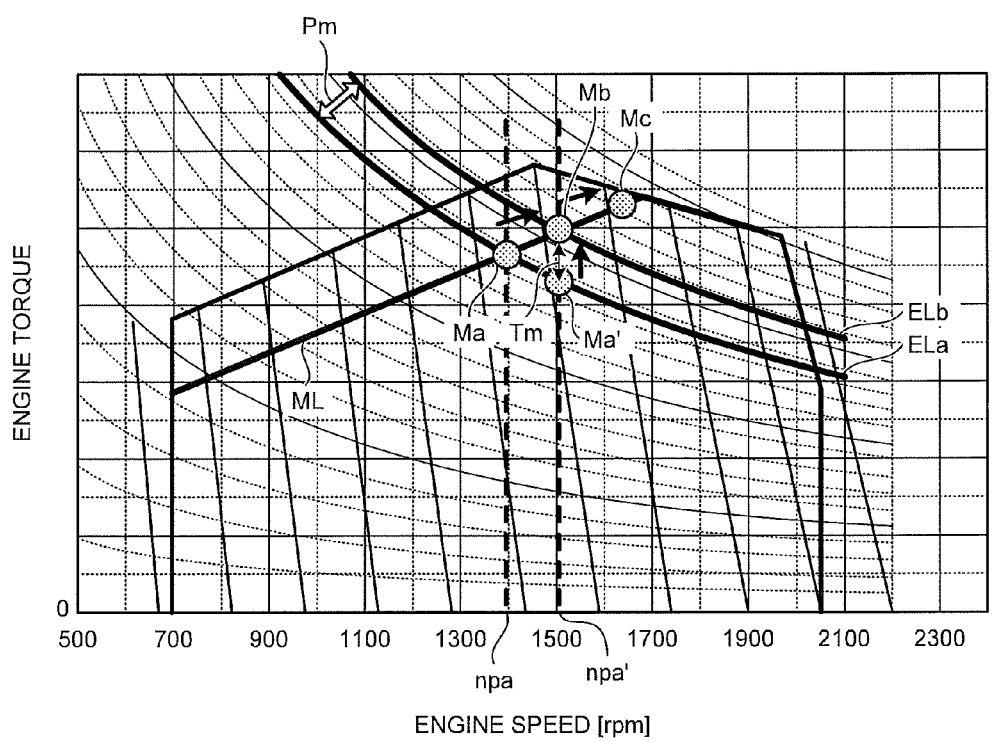
FIG. 15 is a torque line diagram illustrating setting state of the target matching engine speed when the electric power generation is turned ON/OFF.

For this reason, the target matching engine speed calculation block 160 is such that, a minimum electric power generation output calculation block 260 uses the engine speed D108 to calculate the following expression, minimum electric power generation output (kW)=2π÷60×engine speed× minimum electric power generation torque (value is a negative setting value) 1000, and the minimum electric power generation output is obtained, and when the required generator output is less than the minimum electric power generation output thus sought, the output that is not sufficient for the minimum electric power generation output is added to the engine target output by the adding unit 266, and using the added engine target output, it is calculated as a candidate value of the target matching speed with the engine target output/target matching engine speed conversion table 267, so that the change of the engine speed due to the ON/OFF state of the electric power generation ON/OFF is prevented. When there is no required generator output (when, e.g., the output of the engine 17 is to be assisted), a minimum value selection unit (MIN selection) 262 at a stage downstream of the generator output D109 performs comparison with a zero value 261 for zero output. Therefore, nothing is added to the engine target output D240. A maximum value selection unit (MAX selection) 265 is such that, when the required generator output is equal to or more than the minimum electric power generation output, the minimum electric power generation output is not insufficient, and therefore, it is not necessary to perform addition to the engine target output D240. Therefore, a negative value is input into the maximum value selection unit 265, and zero which is the maximum value is selected in the comparison with a zero value 264, and the maximum value selection unit 265 outputs zero. As shown in the expression for obtaining the minimum electric power generation output, the minimum electric power generation output indicates a negative value. This is because the minimum electric power generation torque is set as a negative value. As illustrated in FIG. 11, when the electric power generation is OFF, the minimum electric power generation output is input into an operation device 263, but the minimum electric power generation output is a negative value, and in the operation device 263, plus is obtained from minus and minus. The positive minimum electric power generation output is added to the engine target output D240 by the operation device 266. In this manner, the target matching engine speed npa' is obtained. When the electric power generation is OFF, the engine 17 is driven at the target matching engine speed npa' on the engine target output ELa as illustrated in FIG. 15, but since the electric power generation is OFF, the engine target output ELa has a value that is obtained by adding the fan horsepower to the pump absorption horsepower. However, as described above, at the target matching engine speed npa', the engine 17 is driven at the matching point Ma', but when the electric power generation is ON, the engine 17 is driven with the target matching engine speed npa' until the required generator output D109 reaches the minimum electric power generation output (Pm), and the generator 19 generates electric power.

Figure 12:
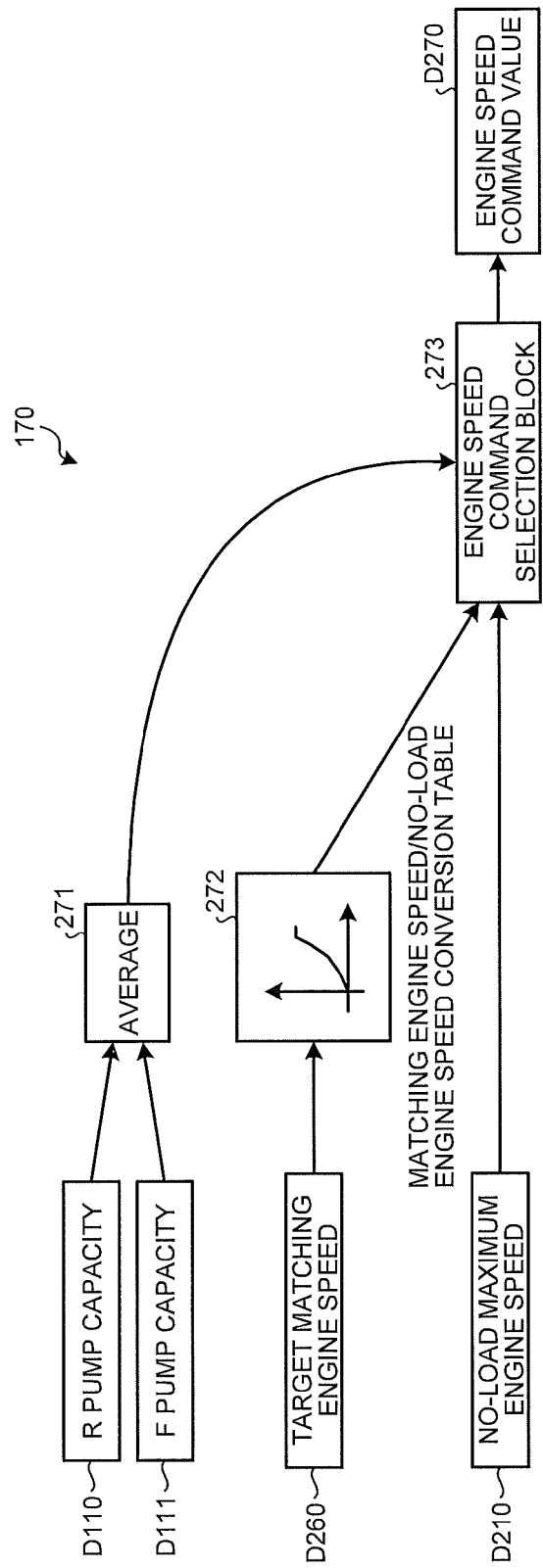
FIG. 12 is a diagram illustrating a detailed control flow of an engine speed command value calculation block as illustrated in FIG. 5.

FIG. 12 is a detailed control flow of an engine speed command value calculation block 170. Hereinafter, explanation will be made with reference to the torque line diagram as illustrated in FIG. 4. As illustrated in FIG. 12, the engine speed command value calculation block 170 is such that, on the basis of the pump capacities D110, D111 obtained based on the swash plate angles detected by the swash plate angle sensors 18a of the two hydraulic pumps 18, an average unit 271 calculates an average pump capacity obtained by averaging the pump capacities D110, D111, and in accordance with the magnitude of the average pump capacity, an engine speed command selection block 273 obtains an engine speed command value D270 (no-load maximum engine speed np2). More specifically, the engine speed command selection block 273 is such that, when the average pump capacity is more than a certain setting value (threshold value), the engine speed command value D270 is brought closer to the no-load maximum engine speed np2 (D210). More specifically, the engine speed is increased. On the other hand, when the average pump capacity is less than a certain setting value, it is brought closer to an engine speed nm1 explained later, i.e., the engine speed is reduced. An engine speed corresponding to a position where the engine torque is zero along the droop line from the crossing point of the torque on the target matching point MP1 and the target matching engine speed np1 (D260) is adopted as a no-load engine speed np1a, and the engine speed nm1 is obtained as a value obtained by adding a lower limit engine speed offset value $\Delta$nm to the no-load engine speed np1a. It should be noted that the conversion into the no-load engine speed corresponding to the target matching engine speed D260 is made by a matching engine speed/no-load engine speed conversion table 272. Therefore, the engine speed command value D270 is determined between the no-load minimum engine speed nm1 and the no-load maximum engine speed np2 in accordance with the state of the pump capacity. The lower limit engine speed offset value $\Delta$nm is a value set in advance, and is stored in the memory of the engine controller 30.

This will be explained more specifically. When the average pump capacity is more than a certain setting value q_com1, the engine speed command value D270 is brought closer to the no-load maximum engine speed np2, and when the average pump capacity is less than the certain setting value q_com1, it is brought closer to the obtained value using the following expression, engine speed command value D270=engine speed np1a obtained by converting target matching engine speed np1 into no-load engine speed+lower limit engine speed offset value $\Delta$nm. The droop line can be controlled by the engine speed command value D270 thus obtained, and when the pump capacity is sufficient (when the average pump capacity is less than a certain setting value), the engine speed can be reduced (engine speed is set as nm1 (no-load minimum engine speed)) as illustrated in FIG. 4, and the fuel-efficiency can be improved while suppressing the fuel consumption. The setting valueq_com1 is a value set in advance, and is stored to the memory of the pump controller 33. It should be noted that the setting valueq_com1 has two setting values both for the engine speed increase side and the engine speed decrease side, and a range may be set in which the engine speed does not change.

Figure 13:
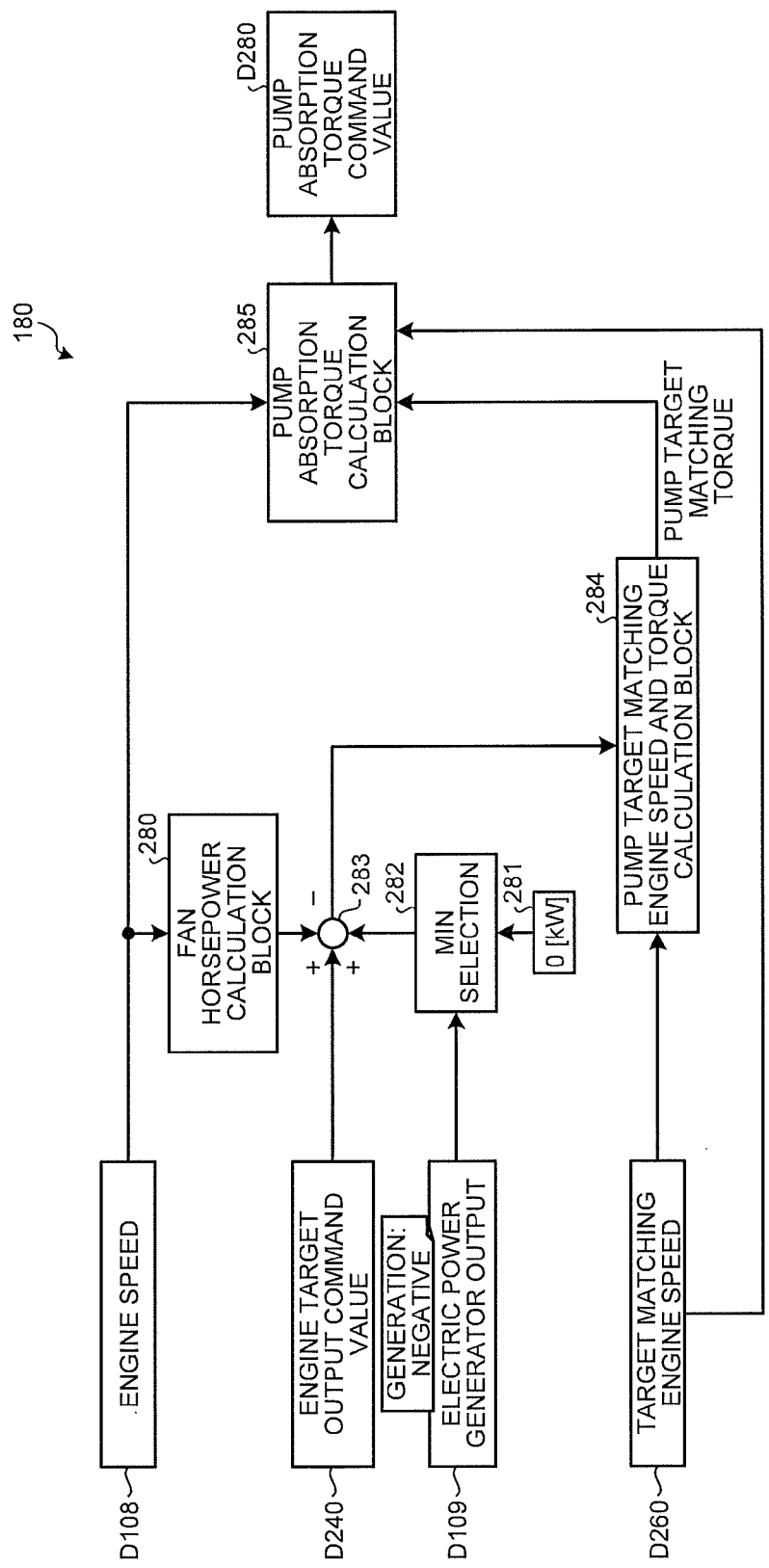
FIG. 13 is a diagram illustrating a detailed control flow of a pump absorption torque command value calculation block as illustrated in FIG. 5.

FIG. 13 is a detailed control flow of a pump absorption torque command value calculation block 180. As illustrated in FIG. 13, the pump absorption torque command value calculation block 180 uses the current engine speed D108, the engine target output D240, and the target matching engine speed D260 to obtain a pump absorption torque command value D280. A fan horsepower calculation block 280 uses the engine speed D108 to calculate the fan horsepower. It should be noted that the fan horsepower is obtained using an expression explained above. The subtraction unit 283 inputs the output obtained by subtracting the fan horsepower thus obtained from the engine target output D240 obtained by the engine target output calculation block 140 (pump target absorption horsepower) into a pump target matching engine speed and torque calculation block 284. In this case, the output obtained by subtracting not only the fan horsepower but also the generator output D109 from the engine target output D240 (pump target absorption horsepower) is output to the pump target matching engine speed and torque calculation block 284. The value of the required generator output has a negative sign, and therefore, the minimum value is selected in the comparison with a zero value 281 by a minimum value selection unit (MIN selection) 282, and the selected value is added to the engine target output D240 by the operation unit 283, and this substantially means that the generator output D109 is subtracted from the engine target output D240.

Further, this target matching engine speed and torque calculation block 284 receives the target matching engine speed D260 obtained by the target matching engine speed calculation block 160. The target matching engine speed D260 is the target matching engine speed of the hydraulic pump 18 (pump target matching engine speed). Then, the pump target matching engine speed and torque calculation block 284 calculates as shown in the following expression, pump target matching torque=(60×1000×(engine target output−fan horsepower))/(2$\pi$×target matching engine speed). The obtained pump target matching torque is output to a pump absorption torque calculation block 285.

The pump absorption torque calculation block 285 receives the pump target matching torque which is output from the pump target matching engine speed and torque calculation block 284, the engine speed D108 detected by the rotation sensor, and the target matching engine speed D260. The pump absorption torque calculation block 285 calculates as shown in the following expression, pump absorption torque=pump target matching torque−Kp×(target matching engine speed−engine speed), and outputs the pump absorption torque command value D280 as a result of calculation. In this case, Kp denotes a control gain.

Such control flow is executed, whereby when the actual engine speed D108 is more than the target matching engine speed D260, the pump absorption torque command value D280 increases as can be understood from the above expression, and on the contrary, when the actual engine speed D108 is less than the target matching engine speed D260, the pump absorption torque command value D280 decreases. On the other hand, the output of the engine is controlled so that the engine target output D240 attains the upper limit, and therefore, as a result, the engine speed is such that the engine 17 is driven stably at an engine speed in proximity to the target matching engine speed D260.

In this case, as illustrated in FIG. 15, the target matching engine speed D260 calculated by the target matching engine speed calculation block 160 explained above is such that, when the electric power generation is OFF, a crossing point of the target matching route ML and the engine output command value curved line ELa indicating the engine target output D240 when the electric power generation is OFF is a target matching point Ma, and the target matching engine speed D260 is a target matching engine speed npa at that moment. When electric power generation is performed with the minimum electric power generation output Pm, an engine output command value curved line ELb indicating the engine target output D240 satisfying the minimum electric power generation output Pm is used, and a crossing point of the engine output command value curved line ELb and the target matching route ML is a target matching point Mb, and the target matching engine speed D260 is a target matching engine speed npa' at that moment.

When the engine control as illustrated in FIG. 11 is not performed, the actual electric power generation output is small with electric power generation less than the minimum electric power generation output Pm, and therefore, transition between the target matching points Ma, Mb frequently occurs due to the ON/OFF of the electric power generation, and at that occasion, the target matching engine speed frequently changes. In this embodiment, when the electric power generation is less than the minimum electric power generation output Pm, the target matching engine speed is set as npa' in advance when the electric power generation is OFF, and the target matching engine speed does not change due to the ON/OFF of the electric power generation. Then, when the electric power generation is OFF, the target matching point is a crossing point Ma' between the engine output command value line ELa and the target matching engine speed npa'. Therefore, when the engine control as illustrated in FIG. 11 is not performed, the matching point changes as follows: Ma→Mb→Mc, in accordance with the increase of the generator output, but in this embodiment, the matching point changes as follows: Ma→Mb→Mc, in accordance with the increase of the generator output, and when the generator output is such a level that the ON/OFF of the electric power generation is switched (transition of the ON/OFF state of the electric power generation), the target matching engine speed does not change, the operator of the hybrid excavator 1 does not feel uncomfortable.

In the engine speed command value calculation block 170, as described above, the minimum value of the engine speed command value D270 is a value obtained by calculation of: engine speed command value=engine speed np1a obtained by converting target matching engine speed np1 into no-load engine speed+lower limit engine speed offset value Δnm, and the droop line of the engine with respect to the target matching engine speed is set at a high engine speed at least in view of the lower limit engine speed offset value Δnm. Therefore, according to the present embodiment, even when the actual absorption torque (pump actual absorption torque) of the hydraulic pump 18 somewhat varies with respect to the pump absorption torque command, the matching is achieved within a range away from the droop line, and even when the matching engine speed of the engine 17 somewhat changes, the engine output is limited on the engine output command value curved line EL, and the engine target output is controlled to be a certain level, and therefore, even when the actual absorption torque (pump actual absorption torque) varies with respect to the pump absorption torque command, variation of the engine output can be reduced. As a result, variation of the fuel-efficiency can also be reduced, and the specification of the fuel-efficiency of the hybrid excavator 1 can be satisfied. The specification of the fuel-efficiency is, for example, the fuel-efficiency can be reduced 10% as compared with a conventional hybrid excavator.

Figure 16:
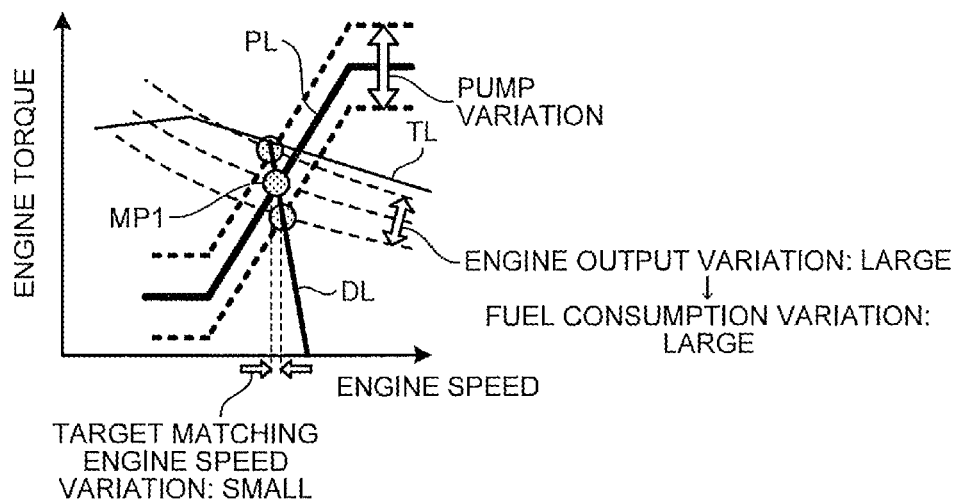
FIG. 16 is a torque line diagram illustrating the state of variation of engine output due to variation of a pump, in conventional engine control.
Figure 17:
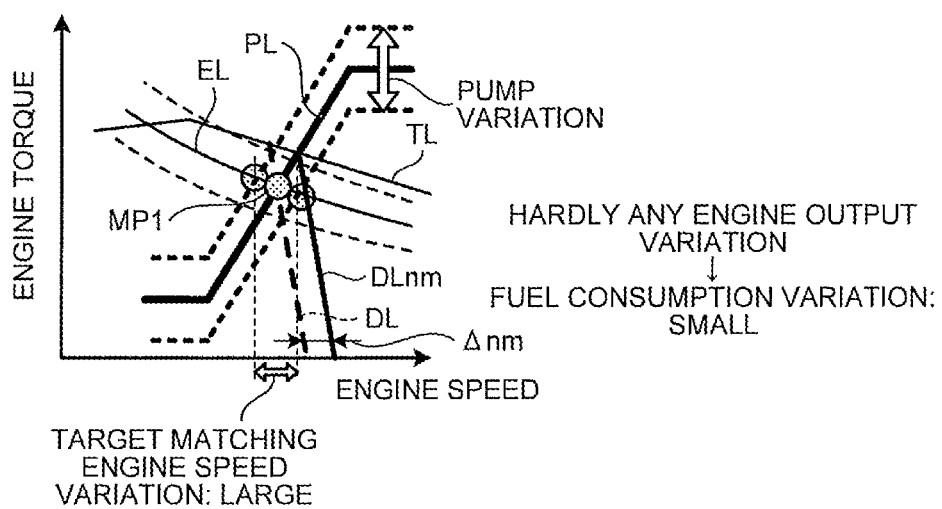
FIG. 17 is a torque line diagram illustrating the state of variation of engine output due to variation of a pump, according to an embodiment of this invention.

More specifically, as illustrated in FIG. 16, in the past, a crossing point of the pump absorption torque line PL and the target matching engine speed is adopted as a target matching point MP1, and therefore, when the successive performance of the hydraulic pump greatly varies, the engine output accordingly greatly varies on the droop line DL. As a result, the fuel-efficiency greatly varies, and there may be a case where it may be difficult to satisfy the specification of the fuel-efficiency of the hybrid excavator 1. In contrast, according to the present embodiment, as illustrated in FIG. 17, the crossing point between the pump absorption torque line PL and the engine output command value curved line EL which is the equal horsepower curved line and indicates the upper limit of the engine output is adopted as the target matching point MP1, and even when the successive performance of the hydraulic pump greatly varies, the target matching point MP1 varies along the engine output command value curved line EL. Therefore, the engine output hardly varies, and as a result, the fuel-efficiency hardly varies.

Figure 18:
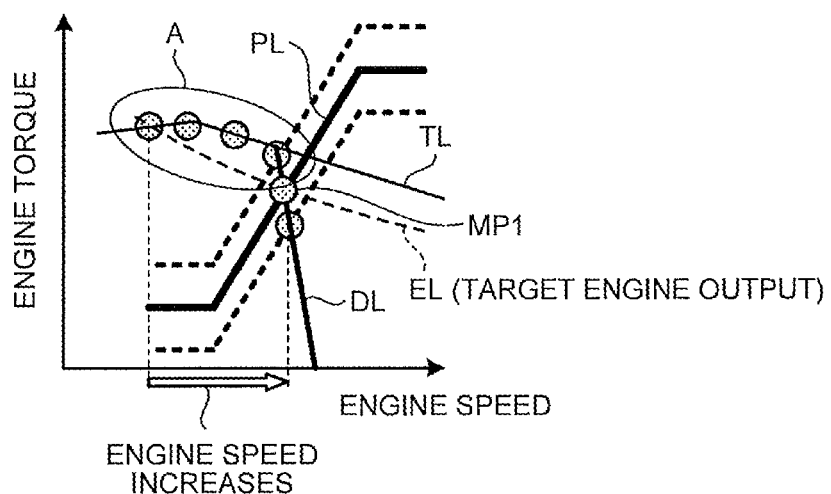
FIG. 18 is a torque line diagram illustrating engine output transition state during change, in conventional engine control.
Figure 19:
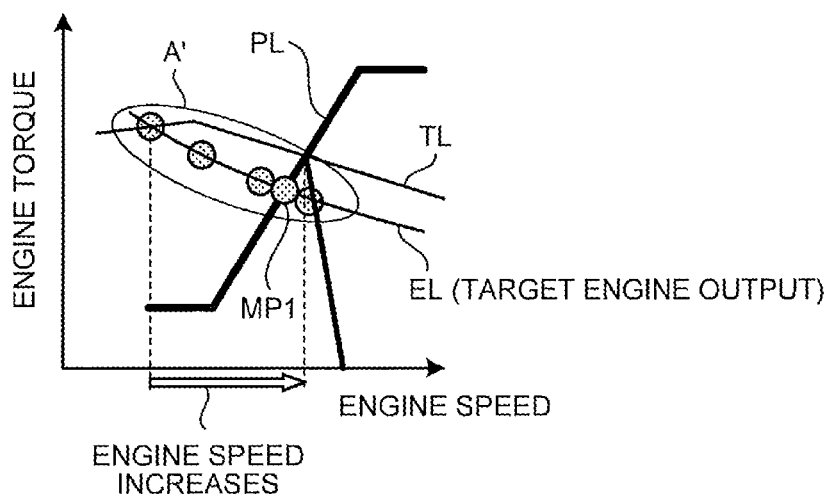
FIG. 19 is a torque line diagram illustrating engine output transition state during change, according to an embodiment of this invention.
Figure 20:
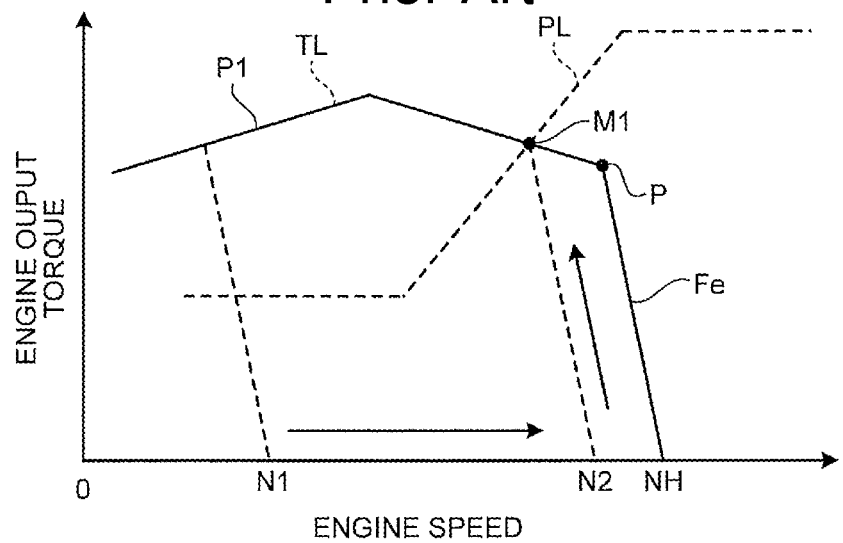
FIG. 20 is a torque line diagram for explaining conventional engine control.

In the conventional engine control, as illustrated in FIG. 18, in a transition state in which the engine 17 changes from the state of idling rotation to increase the engine speed so that the engine output changes to the target matching point MP1, the engine output passes the droop line DL passing the maximum output torque line TL and the target matching point MP1, and therefore, the engine output during the transition is excessively larger than the target engine output as illustrated in an enclosed portion A of FIG. 18, and this deteriorates the fuel-efficiency. In contrast, according to the present embodiment, as illustrated in FIG. 19, the crossing point of the pump absorption torque line PL and the engine output command value curved line EL is adopted as the target matching point MP1, and therefore, during the transition, the engine output changes to the target matching point MP1 along the engine output command value curved line EL as illustrated by an enclosed portion A of FIG. 19. For this reason, even in the transition, the same engine output as the target engine output can be obtained, and this improves the fuel-efficiency.

REFERENCE SIGNS LIST

1 HYBRID EXCAVATOR
2 VEHICLE MAIN BODY
3 WORKING MACHINE
4 LOWER RUNNING BODY
5 UPPER SWING BODY
11 BOOM
12 ARM
13 BUCKET
14 BOOM CYLINDER
15 ARM CYLINDER
16 BUCKET CYLINDER
17 ENGINE
18 HYDRAULIC PUMP
18a SWASH PLATE ANGLE SENSOR
19 GENERATOR
20 CONTROL VALVE
20a PUMP-PRESSURE DETECTION UNIT
21 RUNNING MOTOR
22 CAPACITOR
23 INVERTER
23a HYBRID CONTROLLER
24 SWING MOTOR
25 ROTATION SENSOR
26 MANIPULATION LEVER
27 LEVER MANIPULATION AMOUNT DETECTION UNIT
28 FUEL ADJUSTMENT DIAL
29 MODE SWITCHING UNIT
30 ENGINE CONTROLLER
32 COMMON RAIL CONTROL UNIT
33 PUMP CONTROLLER

The invention claimed is:

1. An engine control device of a work machine comprising:
   a detection unit detecting a driving state of the work machine including a generator;
   a target engine speed setting unit setting, on the basis of the driving state, a target engine speed when electric power generation by the generator is OFF to be same as that when the electric power generation by the generator is ON; and
   an engine target output calculation unit calculating an engine target output during electric power generation OFF which is a maximum output when the electric power generation by the generator is OFF, and calculating another engine target output by adding an output corresponding to an electric power generation amount by the generator to the engine target output during electric power generation OFF when the electric power generation by the generator is ON.

2. The engine control device according to claim 1, wherein the target engine speed setting unit performs control so that an engine speed does not change until a predetermined electric power generation torque is attained, during transition from the electric power generation OFF to the electric power generation ON.

3. The engine control device according to claim 2, wherein the predetermined electric power generation torque is a minimum electric power generation torque set in advance.

4. The engine control device according to claim 1 further comprising:
- an electric power generation output calculation unit for obtaining the predetermined electric power generation output by the generator, using an engine speed of the engine;
- a pump absorption horsepower calculation unit for setting an absorption horsepower of a hydraulic pump; and
- an auxiliary equipment horsepower calculation unit for obtaining a horsepower of auxiliary equipment driving in synchronization with driving of the engine,
- wherein the target engine speed setting unit performs control to set an engine target output corresponding to an output obtained by adding the set pump absorption horsepower, the obtained auxiliary equipment horsepower, and the predetermined electric power generation output by the generator when the electric power generation is OFF, and a target engine speed defined from a target matching route indicating an engine output for driving the engine with a low fuel consumption rate, and performs control so that the engine speed set when the electric power generation is ON becomes the same as the target engine speed.

5. The engine control device according to claim 4, wherein the predetermined electric power generation output is a minimum electric power generation output.

6. The engine control device according to claim 1, wherein the target engine speed, when the electric power generation by the generator is ON, is a target matching engine speed at a crossing point of the engine target output when the electric power generation by the generator is ON and a target matching route.

7. An engine control method of a work machine, comprising:
- detecting a driving state of the work machine including a generator; and
- setting, on the basis of the driving state, a target engine speed when electric power generation by the generator is OFF to be same as that when the electric power generation by the generator is ON, calculating and setting an engine target output during electric power generation OFF which is a maximum output when the electric power generation by the generator is OFF when the electric power generation by the generator is OFF, and calculating and setting another engine target output by adding an output corresponding to an electric power generation amount by the generator to the engine target output during electric power generation OFF when the electric power generation by the generator is ON.

8. The engine control device according to claim 7, wherein the target engine speed, when the electric power generation by the generator is ON, is a target matching engine speed at a crossing point of the engine target output when the electric power generation by the generator is ON and a target matching route.

* * * * *